United States Patent [19]
Schneider et al.

[11] Patent Number: 5,791,134
[45] Date of Patent: Aug. 11, 1998

[54] WINDING DEVICE AND METHOD FOR WRAPPING A PRODUCT BEING PROCESSED IN CABLE TECHNOLOGY

[75] Inventors: Reiner Schneider, Ebersdorf; Thomas Müller, Sonneberg; Horst Knoch, Coburg; Martin Loczenski, Neustadt; Reiner Luthardt, Sonneberg; Günther Kessel, Rödental, all of Germany

[73] Assignee: Siemens Aktiengesellschaft, Munich, Germany

[21] Appl. No.: 793,582

[22] PCT Filed: Apr. 5, 1995

[86] PCT No.: PCT/DE95/00460

§ 371 Date: Feb. 28, 1997

§ 102(e) Date: Feb. 28, 1997

[87] PCT Pub. No.: WO96/07878

PCT Pub. Date: Mar. 14, 1996

[30] Foreign Application Priority Data

Sep. 2, 1994 [DE] Germany .................. 44 31 333.0
Mar. 20, 1995 [DE] Germany ................. 195 10 039.5

[51] Int. Cl.[6] .................................................. D02G 3/36
[52] U.S. Cl. ................ 57/6; 57/3; 57/11; 57/13; 57/15; 57/16; 57/18; 57/264

[58] Field of Search ................ 242/420.5, 420.6, 242/36, 563; 57/3, 6, 9, 10, 11, 13, 14, 15, 16, 17, 18, 264, 293, 294

[56] References Cited

U.S. PATENT DOCUMENTS

| 4,237,687 | 12/1980 | De Vecchis et al. ............. 57/13 |
| 4,256,247 | 3/1981 | Loepfe ........................... 242/36 |
| 4,628,675 | 12/1986 | Sakamoto ...................... 57/264 |
| 4,663,928 | 5/1987 | Delobel et al. ................. 57/3 |
| 5,644,905 | 7/1997 | Luthardt et al. ............... 57/10 |

FOREIGN PATENT DOCUMENTS

| 0 459 322 | 12/1991 | European Pat. Off. . |
| 35 25 022 | 1/1987 | Germany . |
| 3-130438 | 6/1991 | Germany ........................ 242/563 |
| 42 17 092 | 8/1993 | Germany . |
| 3139415 | 4/1983 | Japan ............................ 57/264 |

*Primary Examiner*—William Stryjewski
*Attorney, Agent, or Firm*—Hill & Simpson

[57] ABSTRACT

A method and device for winding an elongated element onto a cable product comprises a probe for measuring the tensile stress of the elongated element as it moves from a supply coil to a point for winding the element onto the cable product.

35 Claims, 15 Drawing Sheets

WINDING DEVICE AND METHOD FOR WRAPPING A PRODUCT BEING PROCESSED IN CABLE TECHNOLOGY

BACKGROUND OF THE INVENTION

The invention relates to a winding device for wrapping an elongated product being processed in cable technology with one or more than one elongated product under a prescribable tensile stress. The device has a supply coil for the respective elongated product, having a measuring probe for determining tensile stresses of the elongated product on its path from the supply coil to the product being processed, and having an evaluation/control device which is assigned to the measuring probe.

A winding device of this type is disclosed by DE 42 17 092 C1. It is constructed as a central spiral winder. Arranged about its central axis is an inner carrying element having a supply coil and, on the outside, concentrically therewith, a carrying element having a cage or flyer. With the aid of the flyer, an elongated product is drawn off from the supply coil and wound onto a cable core, which is led through the inner carrying element. In order to determine the tensile stress of the elongated product, there is applied to the outside of the outer carrying element of the cage (flyer) a measuring probe which rotates with the cage about the central axis. The measuring probe is designed in the manner of a bending beam which extends to the outside in the radial direction away from the outer carrying element. On an end or side facing away from the central axis, the beam has an eyelet through which, on its own, only the elongated product is led on the path from its supply coil to the cable core. The measuring probe is suspended in such a way that it can be deflected axially out of its radial direction at least toward one side. In order to measure the tensile stress, the elongated product is guided through the eyelet of the measuring probe, substantially parallel to the central axis, is deflected in the opposite direction and is only then finally fed to the cable core. Under specific practical conditions, it is possible in particular for disturbing variables, such as centrifugal forces, imbalances, frictional forces, to become additionally effective on a measuring probe which is suspended and designed in this way. As a result, it is possible to falsify the measurement result for the tensile stress of the elongated product very much in an impermissible manner.

DE 35 25 022 A1 discloses a central spiral spinner for cable technology, in which a ribbon-like or thread-like spinning material is pulled off from a rotating supply coil with the aid of a rotating flyer and is wound onto a cable core. This spinning material on its own is led over a dancer device which is firmly connected to the flyer, and which is arranged in the external region of the rotating flyer, along the axis of rotation of the supply coil. The working position of the dancer device in this case depends on the tensile stress of the spinning material and is interrogated for the purpose of regulating the coil speed. During the rotation of a dancer device of this type, it is possible, for example, for centrifugal forces to act on its functional parts of the device and to falsify the measurement result for the tensile stress with which the ribbon-like or thread-like material is being drawn off from the rotating supply coil. Thus, in particular in the case, for example, of relatively large rotational speeds, there is the risk that under certain circumstances overstressing or even breakage of the elongated product may occur, since a prescribed tensile stress for the material used cannot be maintained sufficiently precisely.

EP 0 459 322 A1 discloses, in the specialist area of weaving machine technology, a measuring instrument for determining tensile stresses in a thread which is being fed to a weaving machine. In this case, only this one thread is led on its own through an eyelet, which is mounted on a flexible plate or lamina which is deformed by the axial draw-off direction stress, and, this plate is deformed in the axial thread draw-off direction.

SUMMARY OF THE INVENTION

The invention is based on the object of providing a winding device for cable technology with which, in a simple manner, at least one elongated product may be applied on to a product being processed in cable technology with a precisely controllable tensile stress.

According to the invention, this object is achieved in the case of a winding device of the type mentioned at the beginning in that the measuring probe has a ring shape surrounding both the product being processed and being drawn off in the axial draw-off direction and the elongated product and is designed as a measuring ring in such a way that the elongated product runs along on the inner rim of this measuring ring in the circumferential direction and, in so doing, runs around the product being processed.

This largely avoids disturbing variables, such as frictional forces, centrifugal forces, imbalances, etc, from acting in an impermissible manner on the measuring probe and/or on the elongated product itself, which is passing through the measuring probe. Thus, the actual tensile stress of the respective elongated product can be measured with the aid of the measuring probe largely unfalsified, that is to say satisfactorily. At the same time, for this purpose even a simple path guidance is sufficient for this purpose for the product being processed and for the respective elongated product. In this manner, it is thus made possible to apply the respective elongated product in a reliable manner, that is to say with a precisely controllable tensile stress, onto the product being processed.

According to an expedient development of the invention, the measuring probe is arranged directly in front of the stranding nipple, viewed in the axial draw-off direction of the product being processed. As a result, during the determination of the tensile stress for the elongated product, it is also possible in an advantageous manner simultaneously to take into account tensile forces which additionally become effective only during its path from the supply coil until it runs onto the product being processed. In this way, it is to a large extent ensured that the actual tensile stress force of the elongated product can be measured substantially error free, that is to say as exactly as possible, directly before its application onto the product being processed. The situation is thus to a large extent avoided in which the elongated product runs onto the product being processed whilst subject to further additional forces, such as additional frictional or centrifugal forces, which are not measured at the same time.

According to a further expedient development of the invention, the measuring probe is mounted so as to be displaceable or deflectable along the axial draw-off direction of the product being processed. As a result, external disturbing variables, such as imbalances or centrifugal forces, for example, can become far less disturbing on the measuring probe and thus enter far less into the measurement of the tensile stress of the elongated product. This results in particular in a dynamically improved, that is to say largely low-delay, measurement of the tensile stress of the elongated product, which makes a largely accurate determination of the tensile stress possible in a simple manner under a multiplicity of practical circumstances.

The invention also relates to a process for wrapping an elongated product being processed in cable technology with one or more than one elongated product under a prescribable tensile stress with the aid of a winding device according to the invention, which is characterized in that the product being processed, which is drawn off in the axial draw-off direction, and the elongated product are led together through the measuring probe, which surrounds them annularly as a measuring ring and in that the elongated product runs around the product being processed in the circumferential direction, the elongated product running along on the inner rim of this measuring ring.

Other developments of the invention are reproduced in the subclaims.

DESCRIPTION OF THE PREFERRED EMBODIMENTS

Figure 1:
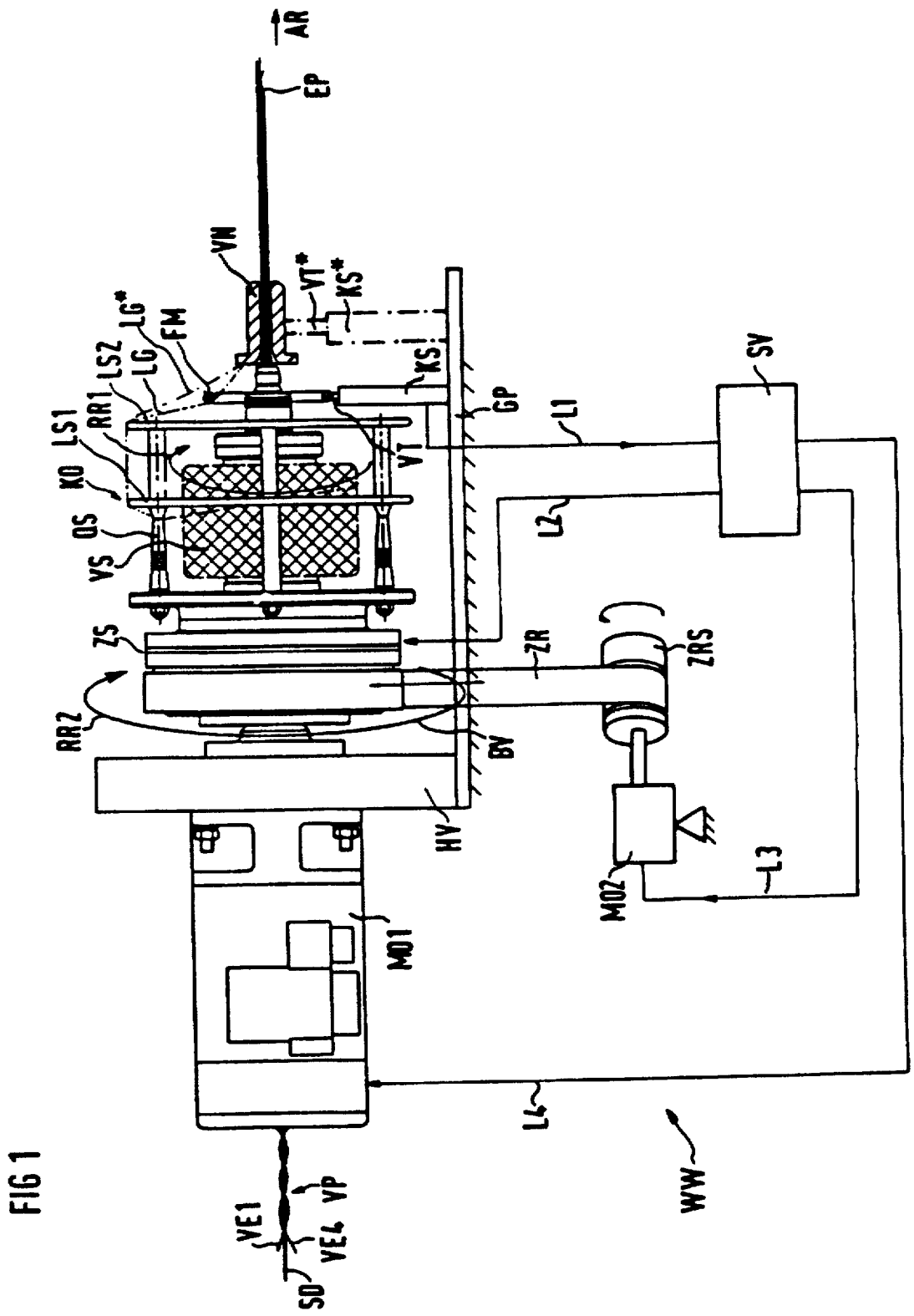
FIG. 1 is a schematic side view with portions in cross section of a measuring probe according to the invention in a SZ wire accumulator stranding machine in cable technology.

FIG. 1 shows schematically the drive part of a stranding device WW having a wire SD as an accumulator for the SZ stranding of a plurality of strand-like stranding elements. In the cross-sectional picture of FIG. 1, for reasons of simplicity, only two of n possible stranding elements having $n \geq 2$, namely the stranding elements VE1 and VE4, are drawn in the left-hand half of the picture during their prestranding with the aid of the accumulator wire SD. Electrical and/or optical transmission elements, such as electrical conductors or wires, optical wave-guides, and so on are preferably considered as stranding elements. They are prestranded on the surface of the accumulator wire SD with alternating direction of lay (SZ stranding) to form a product being processed VP, by virtue of the fact that this accumulator wire SD is moved alternately in the one and then in the other direction of rotation, that is to say is moved alternately about its stranding axis AR. The suspension on the input side and on the output side of the accumulator wire SD, and a stranding disk which is rotated with it, are not represented in FIG. 1.

In order then to fix the mutually SZ-stranded stranding element in their stranding assembly, that is to say in order to avoid to a large extent their stranding lays coming undone, in particular in the region of their reversal points, an elongated element or product LG is applied from the outside in the stranding region (or in the region of their hypothetical stranding point), with the aid of a stranding nipple VN. A retaining spiral, a thread-like or ribbon-like material, a yarn or the like is preferably selected as the elongated product LG. This elongated product LG is drawn off from a rotatable supply coil VS, which is preferably situated on the drive shaft of a drive device MO1, in particular a motor and is driven by the latter such that it rotates about the axis of rotation AR. Arranged concentrically with the supply coil VS, about this axis of rotation AR, is a cage KO (flyer), which draws off the elongated product LG from the supply coil VS. This rotatably suspended cage KO is assigned a dedicated, stationary drive device MO2. The latter drives a toothed belt ZR via a toothed belt pulley ZRS. The toothed belt ZR engages on a toothed wheel ZS which is fitted to that flange of the cage KO facing away from the stranding point. This separate drive for the cage KO is indicated by an arrow RR2. By contrast, in the exemplary embodiment of FIG. 1, the rotary motion of the supply coil VS, which is independent of the aforementioned, is illustrated by an arrow RR1.

The guiding away of the elongated product LG is carried out via the frame of the cage KO. For example, in the cross-sectional picture of FIG. 1, the elongated product LG is firstly guided over a transverse rod QS, extending in the axial direction (or viewed along the axis of rotation AR) and over the outer rim of two guide disks LS1 and LS2 of the cage KO which are arranged concentrically in relation to the axis of rotation AR. The elongated product LG is then guided on its way to the hypothetical stranding point, viewed in the axial direction AR, directly behind the supply coil VS through a stationary measuring probe. This measuring probe is essentially formed by a measuring ring FM arranged concentrically with the axis of rotation AR, and through whose center the product being processed VP is drawn. The elongated product LG, on the other hand, comes to rest under stress on the inner rim of the preferably circular measuring ring FM during its drawing-off motion. As a result of the rotary motion of the supply coil VS and/or of the cage KO, the product LG runs in the circumferential direction along this inner rim of the measuring ring FM, that is to say the elongated product executes a rotary motion about the axis of rotation AR, resting on the inner rim of the measuring ring FM.

Since the measuring ring FM, constructed as a measuring probe, is positioned or arranged between the supply coil VS and the stranding nipple VN, virtually all the tensile forces which become effective on the elongated product LG before its arrival at the hypothetical stranding point, are simultaneously taken into account during the measurement or determination of the tensile stress for the elongated product. The situation is thus largely avoided in which the elongated product runs in at the stranding point whilst subject in an uncontrolled manner to additional forces which are not simultaneously measured, such as additional frictional or centrifugal forces. By virtue of the fact that the measuring ring FM is arranged directly before the stranding nipple VN, friction points, such as were formed, for example, until now by the frame of the cage KO for the forwardly transported, elongated product LG, are now essentially no longer present on the remainder of its way from the measuring ring FM to the stranding nipple VN.

The measuring ring FM preferably has an internal diameter which is equal to or larger than the internal diameter of the subsequent stranding nipple VN. Expediently, the internal diameter of the measuring ring FM is selected to be between 0.2 and 20 cm, in particular about 10 cm. In FIG. 1, the measuring ring FM, viewed in the axial direction AR, is, for example, arranged approximately in the center between the supply coil VS and the stranding nipple VN. It is especially favorable to position the measuring probe, designed as measuring ring FM, as directly as possible before the stranding nipple VN, that is to say as close as possible to the hypothetical stranding point of the elongated product LG. Thus, the measuring ring FM can, for example, also preferably be fitted directly at the input to the stranding nipple VN. Expediently, the measuring probe, viewed in the axial direction AR, has a spacing from the hypothetical stranding point of the stranding nipple VN of between 5 and 10 cm.

The measuring probe, in particular the measuring ring FM, is assigned a force sensor KS in FIG. 1. For this purpose, the measuring ring FM is preferably rigidly fitted on the force sensor KS using a connecting part VT. Particularly expediently, the measuring probe, in particular the measuring ring FM, and/or its connecting part VT are each constructed as a non-resilient element. For the measuring probe, use is expediently made of a stiff, preferably polished, material.

The force sensor KS, which is firmly connected to the measuring ring FM, is fitted in a stationary manner on a base plate GP on which at the same time a holding device HV for the remaining components of the SZ stranding device WW, such as for example for the cage KO, for the drive device MO1, etc., is also fastened.

Figure 2:
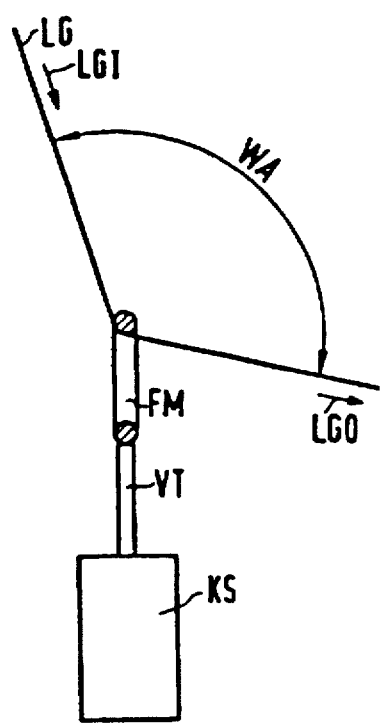
FIG. 2 is an enlarged view of the measuring probe according to FIG. 1.

In its rest position, the measuring ring FM is adjusted in a manner free of deflection such that the axis of rotation AR is approximately at right angles to the hypothetical measuring ring area, which preferably has a circular cross section. In FIG. 2, the measuring probe extends essentially at right angles to the axis of rotation AR in the rest position. The measuring probe, constructed as measuring ring FM, therefore extends essentially in the radial direction in relation to the axis of rotation AR. In its rest position, said measuring probe is expediently free of force, load and tension.

The elongated product LG, coming from the cage KO or from the supply coil VS, is then deflected by the measuring ring FM out of its original draw-off direction. This deflection by the measuring ring FM is represented schematically enlarged in FIG. 2. Elements from FIG. 1 which have been taken over without change are provided with the identical reference symbols in FIG. 2. The elongated product LG, coming from its supply coil VS, has in front of the measuring ring FM a draw-off direction LGI and, on being fed through the measuring ring FM into a new draw-off direction LGO, is deflected or diverted obliquely toward the stranding nipple VN. As a result of the deflection, a measuring force acts on the measuring ring FM, and the force is detected by the force sensor KS. Expediently, in this arrangement the elongated product LG is deflected through an angle WA, which is between 2° and 60° from the draw-off direction LGI before the measuring ring FM and the draw-off direction LGO after the measuring ring FM.

Figure 3:
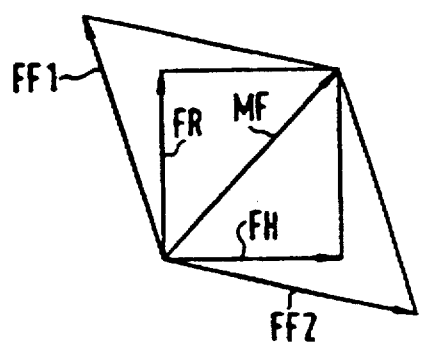
FIG. 3 is a force diagram for the measuring probe according to FIGS. 1 and 2.

The forces acting on the measuring probe essentially as a result of the deflection of the elongated product LG are drawn by way of example in the force diagram of FIG. 3. As a result of the guidance of the elongated product LG on the internal rim of the measuring ring FM, a tensile force is exerted on the latter in the opposite direction to the draw-off direction LGI, as is a tensile force in the draw-off direction LGO. These two tensile forces on the measuring probe are illustrated in FIG. 3 using vector arrows FF1 and FF2. Their vectorial addition then yields the actual tensile force acting on the measuring ring FM, and this force is provided in FIG. 3 with the reference symbol MF. The tensile force MF may be partitioned, for example, into a radial component FR and into an axial component FH which acts parallel to the draw-off direction AR.

If the position and the location of the measuring ring FM remains constant in operation, that is to say it is always unchanged at the same location, the result is then preferably also constant, geometrical relationships in the force diagram. The tensile force MF actually acting on the measuring ring FM therefore always points in the same direction, whereas its magnitude can change. In order to evaluate the tensile force MF actually acting on the measuring ring FM, it is then already, advantageously sufficient, if the force sensor KS measures, for example, only one force component of the tensile force MF: here, particularly preferably, either the radial component FR or the axial component FH. The respective force component is then directly proportional to the tensile force FF1 or FF2 actually acting on the elongated product LG. In this way it is possible to determine the tensile stress force of the elongated product LG in a very simple manner with the aid of the measuring probe. If appropriate, it can also be expedient to determine the actual tensile force MF directly by means of the force sensor KS or on the measuring ring FM and then to determine conclusions about the tensile stress force FF1 or FF2 engaging on the elongated product LG from this vector variable.

If the force sensor KS of FIG. 1, for example, processes only forces in the axial direction of the measuring probe, that is to say only the respective radial component FR (cf. FIG. 3) of the tensile force MF actually engaging on the measuring ring FM, the result, during the running motion of the elongated product LG in the circumferential direction on the internal rim of the measuring ring FM, is an approximately sinusoidal force profile (sine curve during one rotation), to which the measuring ring FM is subjected.

The force sensor KS converts the tensile forces picked up into electrical measuring signals in each case, which are fed via a line L1 to an evaluation device SV. The evaluation device SV produces control signals therefrom for driving the drive devices MO1 and MO2 for the supply coil VS and the cage KO. In FIG. 1, the evaluation device SV in detail controls the drive device MO1 of the supply coil VS via a line L4, and the drive device MO2 for the cage KO via a line L3. In the case of a sinusoidal force profile, that is to say in the case of evaluation, for example, of only the radial force component FR, the evaluation device SV expediently has evaluation electronics which are constructed as a peak value measurement and, for reasons of measurement accuracy, then also simultaneously include the absolute value of the negative peak value. It is then preferably possible to achieve two measured values per rotation of the elongated product LG, the average of these yielding a measured variable which is directly proportional to the tensile force, such as FF1 or FF2, for example, of FIG. 3, actually becoming effective on the elongated product LG.

As a result of the improved tensile stress determination, it is possible to observe a prescribed defined tensile stress force, with which the elongated product is applied to the product being processed VP in the stranding nipple VN, at least in a narrow tolerance band, or even to observe it exactly. Since the measuring probe is positioned in the direct vicinity of the stranding nipple VN, all the forces previously acting on the elongated product LG are also taken into account at the same time during the measurement. The measurement also includes additional forces which can be brought about on the elongated product LG on its way to the stranding point as a result of friction points, such as on the frame of the cage KO, or as a result of centrifugal forces of the elongated product LG, rotating about the axis of rotation AR, while it is being pulled off from the supply coil VS. The elongated product LG, on the remainder of its way from the measuring probe to the hypothetical stranding point, can therefore hardly be subjected in an uncontrolled manner to further additional forces which are not simultaneously measured, such as additional frictional or centrifugal forces.

It can be especially expedient to provide the stranding nipple VN itself as measuring probe, that is to say the measuring probe is essentially formed by the stranding nipple VN. In FIG. 1, the force sensor assigned to the stranded nipple VN is then provided with the reference symbol KS*, and its associated connecting piece is provided with the reference symbol VT*. The elongated product LG coming from the cage KO along a rectilinear path runs into the stranding nipple VN, resting on the internal covering of the cone-shaped entry opening of the stranding nipple VN and pressing on the latter. The stranding nipple VN thus forms a type of measuring tube or measuring ring for the elongated product, which is now designated by LG* and whose course is drawn with a broken line. The direct determination of the tensile stress of the elongated product LG* at the stranding location or at the hypothetical stranding point results advantageously in a particularly accurate measured values for the tensile force caused at the stranding nipple by the elongated product LG* running in. From this, particularly accurate conclusions may be drawn as to the magnitude and direction of the tensile stress actually acting on the elongated element or product LG*, for example according to FIGS. 2 and 3. In this manner, a prescribed, defined tensile stress for the elongated product LG* can be observed with a particular accuracy.

The result is thus an end product EP which is wound with the elongated product LG* or LG. The end product preferably has a diameter between 1.5 and 9.8 mm. Expediently, for this purpose a stranding nipple having an internal diameter between 2 and 10 mm is selected, that is to say the internal diameter of the stranding nipple VN is preferably somewhat larger than the external diameter of the end product EP, in particular between 0.2 and 0.5 mm.

Expediently, a cable core of electrical and/or optical cable is selected as the elongated product being processed. This cable core can be formed, for example, by electrical and/or optical transmission elements, such as electrical leads (wires), optical waveguides, etc. which if necessary are stranded with one another in accordance with FIG. 1. Threads, retaining spirals, ribbons, yarns, electrical and/or optical transmission elements, etc are preferably selected as the elongated product LG. In addition to the preferred field of application in winding devices in the cable technology, there are also further possibilities in which the application of the elongated product with as defined a tensile stress as possible is desired. These may be, for example, helical winders in the textile industry or winding devices for pipes to be insulated, etc.

Finally, the measuring probe according to the invention is also distinguished by the fact that it is fitted in a fixed manner on a base plate (cf. GP in FIG. 1). This means that it is not necessary for the measuring probe to co-rotate with the elongated product. This saves a complicated suspension of the measuring sensor and at the same time reduces the oscillating mass of the stranding device. This plays a not inconsiderable part, in particular, in the case of high rotational speeds, such as can occur, for example, during the stranding of optical fibers to form an optical transmission element or telecommunications cable. Using the SZ wire accumulator stranding machine of FIG. 1, in particular, rotational speeds of up to 8,000 revolutions per minute may be run.

Figure 4:
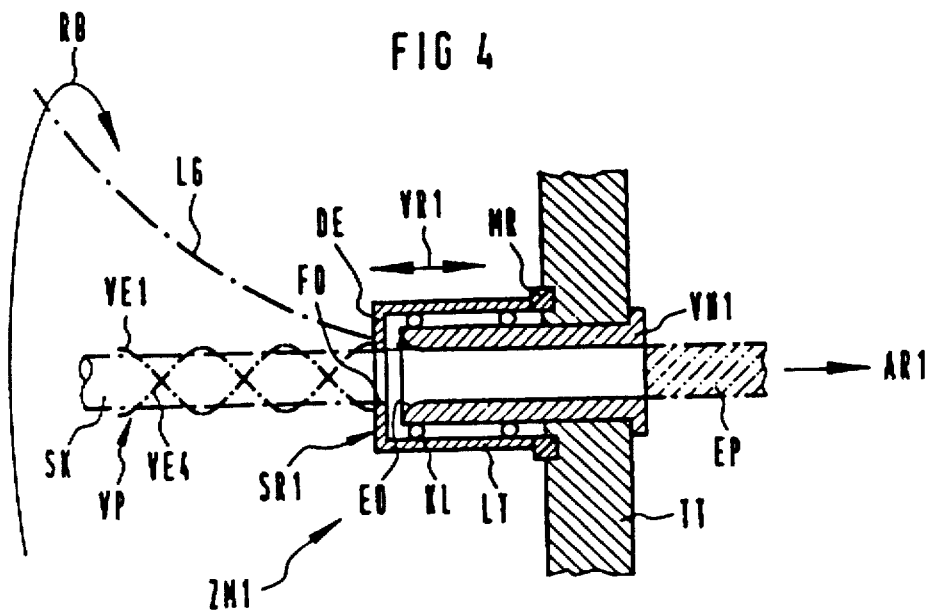
FIG. 4 is an enlarged cross sectional view of a measuring probe according to the invention for measuring the tensile stress of an elongated product.

FIG. 4 shows in schematic form in cross section a measuring device ZM1 according to the invention for measuring the tensile stress of an elongated product LG while it is being applied to an elongated product being processed VP. In FIG. 4, the product being processed VP and the elongated product LG are additionally indicated by dash-dotted lines. The elongated product LG is preferably wound around the product being processed VP. Structures or configurations of electrical and/or optical transmission elements are considered for the elongated product being processed VP. The structures or configurations may be, for example, groups of electrical leads (wires) such as, for example, so-called "ICCS Quads" ("integrated computer communication systems"), groups or bundles of optical fibers, of optical fiber loose buffers, in particular of thermoplastic or other thin-walled loose buffers, of optical fiber multifiber bundles, optical fiber ribbons of ribbon stacks, as well as other configurations of electrical and/or optical wires, in particular for telecommunications transmission. The electrical and/or optical transmission elements are preferably combined into a group with the aid of the elongated product LG. The product being processed VP is preferably formed by a cable core having electrical and/or optical transmission elements. The transmission elements can in this case be present loosely or, if appropriate, stranded with one another. The product being processed VP is preferably formed by at least one bundle of optical fibers which may be loosely combined to form a group or, if appropriate, also stranded with one another. In FIG. 4, on grounds of simplicity, only two of n possible transmission elements, with n≧2, namely the transmission elements VE1 and VE4 are drawn with chain-dotted lines in the left half of the figure by way of example during their stranding onto a circularly cylindrical central element SK. The central element SK is preferably used as an electrical and/or optical transmission element, a bundle of electrical and/or optical transmission elements or a high-tensile core element, for example made of aramid or steel wires. The transmission elements can be stranded with one another as stranded elements, preferably using alternating direction of lay (SZ-stranding), it also being possible for the central element SK to be omitted, if appropriate.

In order then to fix the mutually, preferably SZ-stranded, transmission elements, such as for example VE1, VE4, in their stranded assembly, that is to say to avoid losing their stranding lay, in particular in the region of their reversal points, to a large extent, the elongated product LG is applied to them, in particular wound onto them, from the outside in the region of their hypothetical stranding point with the aid of a stranding nipple VN1. Threads, retaining spirals, ribbons, yarns, electrical and/or optical transmission elements and other thread-like or ribbon-like material is preferably selected as the elongated product LG. A winding with threads of a low flexibility and/or ductility is especially expedient.

The stranding nipple VN1 preferably also defines the stranding point for the stranding elements VE1, VE4, in particular optical fibers, to be stranded with one another. The stranding nipple VN1 is constructed for this purpose as an approximately circularly cylindrical tube, which extends in the axial passage direction AR1, that is to say along the axial draw-off axis of the product being processed VP. In the entry region, the stranding nipple VN1 has an approximately funnel-like or conically tapering entry opening EO. The nipple is firmly fitted by its output end to a stationary carrying part TT so as to lie horizontally, and the carrying part TT extends in the vertical direction. The product being processed VP is led through this stranding nipple VN1 in the axial draw-off direction AR1. In so doing, it is wrapped or served by the elongated product LG in the circumferential direction, preferably in a helical shape, so that the finished end product EP occurs at the outlet of the stranding nipple VN1. The elongated product LG is drawn off for this purpose from a rotating supply coil (such as shown, for example, in FIG. 8), which rotates about the draw-off axis AR1. This rotary motion of the elongated product LG around the product being processed VP is indicated in FIG. 4 by an arrow RB. The supply coil VS has been left out in FIG. 4 for reasons of clarity. The elongated product LG runs around on the inner rim of the funnel-shaped entry opening of the stranding nipple VN1, that is to say around the product being processed VP in the circumferential direction, and thus helically wraps the product VP.

In order then to be able to determine or to measure the tensile stress F (see FIG. 8) of the elongated product LG as accurately as possible, a measuring probe SR1 is assigned to the stranding nipple VN1. This measuring probe SR1 preferably surrounds the stranding nipple VN1 and hence also the product being processed VP concentrically. It is of an annular design, in particular of a circularly-cylindrical design. Thus, it advantageously has a rotationally symmetrical shape by means of which the action of the forces on it, for example on one side, are largely avoided. The central or longitudinal axis of the measuring probe SR preferably coincides as far as possible with the axial draw-off axis AR1 of the product being processed VP, that is to say it is suspended concentric with the axial draw-off axis AR1. In FIG. 4, the measuring probe SR1 is shaped as a type of measuring can having a cylindrical part LT and an annular covering part DE, which extends over the entry opening EO of the stranding nipple VN1. In this arrangement, a guide opening FO for the elongated product LG is situated in the covering part DE directly in front of the entry opening EO of the stranding nipple VN1. The cylindrical part LT of the annular measuring probe SR1 has, in FIG. 4, an internal diameter which is preferably selected to be somewhat larger than the internal diameter of the subsequent stranding nipple VN1. In particular, the cylindrical part LT has an internal diameter which is selected to be between 1.5 and 5 times larger than the internal diameter of the stranding nipple VN1. Preferably, the internal diameter of the measuring probe SR1 is selected to be between 1.5 and 5 times larger than the external diameter of the product being processed VP. Expediently, the internal diameter of the essentially circularly round guide opening FO of the measuring probe SR1 corresponds to the internal diameter of the entry opening EO of the stranding nipple VN1. The guide opening FO is preferably selected to be somewhat larger than the entry opening EO, in order to be able to ensure for the elongated product LG a continuous, smooth, in particular parabola-shaped guide path to the hypothetical stranding point. For this purpose, the inner rim of the measuring probe SR1 in the guide opening FO is preferably rounded off, in order to avoid as far as possible damage to the elongated product LG during its drawing off.

The measuring probe SR1 is mounted on the outside on the outer circumference of the stranding nipple VN1 so as to be displaceable along the axial draw-off axis AR1, which is indicated by a double arrow VR1. The axial displaceability of the measuring probe SR1 along the axial draw-off axis AR1 is effected in FIG. 4 by means of ball-bearings KL in the interspace between the inner wall of the cylindrical longitudinal part LT of the can-like measuring probe SR1 and the outer wall of the stranding nipple VN1. Of course, sliding bearings, air bearings or the like can be considered as bearing means for the axial displaceability of the measuring probe SR1. By virtue of this low-friction and rotationally-symmetrical suspension of the measuring probe SR1 with respect to the axial draw-off axis AR1, loading the measured values with impermissible disturbing variables and hence falsification of the measurement result are largely avoided. Therefore, in FIG. 4, the measuring probe SR preferably surrounds the elongated product LG and simultaneously the product being processed VP, that is to say the two either together or jointly. In particular, the probe SRJ concentrically surrounds the elongated product being processed VP, the latter essentially running rectilinearly in the draw-off direction. In this case, the probe SRJ is suspended such that is displaceable along the axial draw-off axis AR1 of the product being processed VP and, at the same time, of the elongated product LG, that is to say the longitudinal or central axis of the probe SRJ essentially coincides precisely in terms of position with the axial draw-off axis. In other words, this means that the measuring probe SRI is suspended in such a manner that the center of the guide opening FO lies as far as possible on the axial draw-off axis AR1. The elongated product LG and the product being processed VP are led together through the annular measuring probe SRI, the elongated product LG running around the product being processed VP in the measuring probe SRI.

The measuring probe SR1 of FIG. 4 is assigned on the output side at least one force sensor MR, which is fastened in a stationary manner on the carrying part TT. This force sensor MR is designed in FIG. 4 as a pressure measuring ring, on which the longitudinal part LT of the can-like measuring probe SR1 presses on the output side as a result of the action of force due to the elongated product LG. If, for example, the tensile stress force F of the elongated product LG increases, the pull also becomes greater on the inner rim of the guide opening FO of the measuring probe SR1, that is to say at the entry of the covering part DE, in the draw-off direction or along the axial draw-off axis AR1. The measuring probe SR1, which is slipped over the stranding nipple VN1, is therefore carried along in the axial direction, that is to say it is moved in the axial direction further toward the pressure measuring ring MR, and produces an increased pressure force there. If, conversely, the tensile stress force F of the elongated product LG decreases once more, the frictional force of the elongated product LG is also reduced as a result of the draw-off or dragging motion on the inner rim of the guide opening FO. As a result, the axial component, acting on the measuring probe SR1, of the tensile stress force F is also reduced, so that the carrying-along movement on the pressure measuring ring MR is reduced. At the pressure measuring ring MR, a smaller pressure force than previously applied is thus measured. Expediently, it can optionally also be the case that the measuring probe SR1 is suspended rotatably, so that it can be set into rotation by the elongated product LG running around in the guide opening FO. This further reduces in an advantageous manner the friction on the elongated product LG passing through the opening FO.

The measuring device ZM1 according to the invention, in particular the measuring probe SR1 according to the invention, is distinguished above all by the fact that a change in the tensile stress force F becoming effective on the elongated product LG can be converted virtually without delay into a measurable pressure force. For this purpose, the pressure measuring ring MR forms on the output side a fixed stop for the bottom end of the axially displaceable measuring probe SR1, that is to say there is virtually no play and hence virtually no delay path between the outlet side of the longitudinal part LT of the measuring probe SR1 and the pressure measuring ring MR. Preferably, the measuring probe is even fitted in such a way to the pressure measuring ring MR in an unloaded rest position that even minimum longitudinal displacements of the measuring probe SR1 bring about a measurable pressure force in the pressure measuring ring. In operation, as soon as an elongated product LG is running along in the circumferential direction on the inner rim of the guide opening FO of the measuring probe SR1, and in so doing is drawn off in the direction of the product being processed VP, the outlet side of the measuring probe SR1 presses on the pressure measuring ring MR. Starting from this working position, the measuring probe SR1 then loads the pressure measuring ring MR more or less, depending on the displacement position. This makes it possible to convert the actual tensile stress on the elongated product LG virtually without delay and hence with a particularly fast reaction into an axial displacement movement of the measuring probe SR1 and finally into a measurable pressure force. Given an approximately constant run-in angle of the elongated product LG into the approximately funnel-shaped entry region which is formed by the entry openings FO and EO, situated one behind the other, of the measuring probe SR1 and of the stranding nipple VN1, this pressure force is directly proportional to the axial force component of the actual tensile stress force F actually becoming effective on the elongated product LG. The force sensor MR, which is designed as a pressure measuring ring, converts the pressure force produced preferably into an electrical measuring signal, which can be further evaluated for the control or regulation of the tensile stress of the elongated product LG. (More detailed explanations of the evaluation will be made in relation to FIG. 8).

Furthermore, by means of the annular shape of the covering part DE, in particular the cylindrical shape of the longitudinal part LE of the measuring probe SR1 and the annular design of the force sensor MR, it is ensured that, during the rotary motion of the elongated product LG about the longitudinal axis of the product being processed VP, that is to say while the elongated product LG is running around on the inner rim of the guide opening FO of the measuring probe SR1, the axial force component of the tensile stress F being exerted at that time can be registered continuously. In other words, this means that, in each circulation position of the elongated product LG around the outer circumference of the product being processed VP, a measuring signal is generated and provided continuously or at any time. In every circulating angular position, as a result of the annular design of measuring probe and force sensor, a measuring signal is obtained for the actual tensile stress force acting on the elongated product LG. In this way, a gap-free, largely delay-free measuring signal pickup for the tensile stress force F and hence for its chronologically completely or largely uninterrupted monitoring is enabled. Since the measuring probe SR1 is mounted so as to be displaceable in the axial direction, a measurement is advantageously made of only the component of the tensile stress force F acting in the longitudinal direction, so that a particularly simple assessment or evaluation of the measuring signals picked up is enabled. Subsequent decomposition of the forces is hence therefore not necessary. The low-friction axial displaceability of the measuring probe allows a direct conversion, with a low delay, of the tensile stress force into a pressure measuring force proportional thereto. Falsifications of the measurement result as the result of impermissible disturbing variables are thereby largely avoided, so that the tensile stress actually engaging on the elongated product LG can essentially be measured without error. This plays a not inconsiderable role, particularly during the measurement of very small tensile stresses, such as are prescribed, for example, during the application of a retaining spiral onto a bundle of optical fibers to be wrapped.

A measuring probe of this type, in particular by comparison with normal dancer measuring devices, avoids, for example, large oscillating masses far outside the axis of rotation of the supply coil and/or its associated unwind device. In this way, it is made possible to measure the tensile stress of the elongated product particularly rapidly and accurately, that is to say as far as possible without being impermissibly subject to disturbing variables. Any tensile stress fluctuations which, for example, are caused by different path lengths of the elongated product during unwinding from the supply coil, can be registered directly and provided for evaluation. As a result, it is advantageously made possible to detect deviations from the predefined, desired value of the tensile stress force F for the elongated product LG, that is to say stress fluctuations, with low delay and, if appropriate, to control them out. Also, it is only by virtue of the low-friction and low-delay suspension of the measuring probe SR1 that it is possible to register very small tensile stresses at all, since disturbing variables can enter to a far lesser extent into the measurement. Loading the measuring probe SR1 with undefined forces is therefore largely avoided, so that the actual, that is to say the true, tensile stress force F of the elongated product can be measured.

Figure 5:
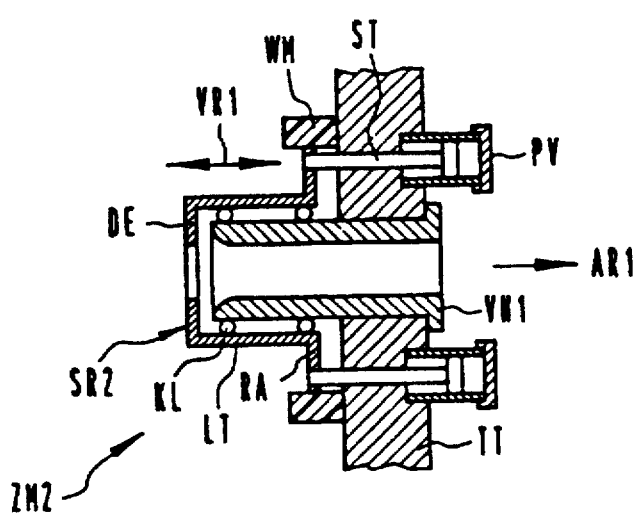
FIG. 5 is an enlarged cross sectional view of a first modification of the measuring probe according to the invention according to FIG. 4.

FIG. 5 shows a measuring device ZM2 which is modified in relation to FIG. 4 and has a modified measuring probe SR2, elements transferred unchanged from FIG. 1 being provided with the same reference symbols. The measuring probe SR2, as distinct from the measuring probe SR1 of FIG. 4, is additionally loaded with a prestress in the axial direction. For this purpose, in FIG. 5 axial prestressing means PV, such as pneumatic pistons, are provided. These are fitted on the stationary carrying part TT, concentrically to the stranding nipple VN1 and on the outlet side. Instead of the pneumatic pistons, compression springs or the like can also expediently be used. The pneumatic pistons are in each case let into a through hole in the carrying part TT in FIG. 5. In this case, they engage with their plungers ST in each case on the other side of the carrying part TT (on the left side) on the radially outwardly projecting rim RA on the outlet side of the measuring probe SR2. The measuring probe SR2 of FIG. 5 is therefore modified, by contrast with the measuring probe SR1 of FIG. 4, to the extent that in FIG. 5 it additionally has a radially outwardly pointing brim, rim or flange at the bottom end of its circularly cylindrical longitudinal part LT. Otherwise, it is of identical design. This radially outwardly projecting, flange-like rim RA, running all around, of the measuring probe SR1 is assigned, radially further to the outside, a preferably annular distance measuring pickup WM. This distance measuring pickup WM is likewise firmly fitted on the carrying part TT. In this arrangement, it extends approximately parallel to the axial axis AR1 and surrounds the rim RA of the measuring probe SR2 like a tube, in particular concentrically. A light barrier, a capacitive or inductive measuring probe or the like is preferably considered for the distance measuring pickup WM. The modified measuring probe SR2 is mounted with the radially outwardly projecting rim RA such that it is displaceable with respect to the stationary distance measurement pickup WM in the axial direction, in a manner analogous to the suspension of FIG. 4. Depending on the position of the rim RA, the measuring probe SR2 is assigned a specific, relative displacement travel which reproduces a change in the tensile stress force of the elongated product LG. Since the measuring probe SR2 can slide inside the annular distance measuring pickup WM, a largely low-friction pickup of measured values is enabled. Preferably, the rim RA of the measuring probe SR1 is fitted with play, that is to say with a gap or spacing, in relation to the distance measuring pickup MR, which enables contactless position measurement. This plays a role, in particular, in the acquisition of very small tensile stress forces, in order largely to avoid falsifications of the measured values by disturbing variables.

With the aid of the prestressing means PV, in particular pneumatic pistons, it is advantageously made possible to allocate to the measuring probe SR a defined, unloaded rest position or starting position. Under the action of the tensile stress of the elongated product LG, the measuring probe SR2 is displaced in the draw-off direction or along the axial axis AR1 into an operating position. The displacement travel traced in so doing from the rest position to the operating position is registered by the distance measuring pick-up WM as a further evaluable measured variable. The latter is directly proportional to the axial component of the tensile stress force actually acting on the elongated product LG.

Figure 6:
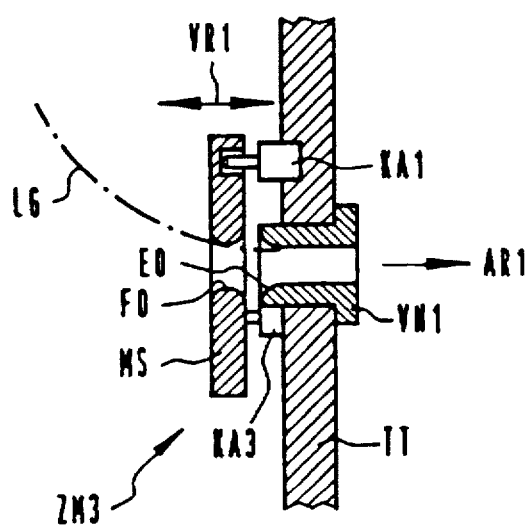
FIG. 6 is an enlarged cross sectional view of second, a modification of the measuring probe according to the invention according to FIG. 4.

FIG. 6 shows a further device ZM3 according to the invention for detecting the tensile stress of an elongates product LG, elements taken over unchanged from FIGS. 4 and 5 being provided in each case with the same reference symbols. As distinct from FIGS. 4 and 5, in FIG. 6 the measuring probe is designed as an approximately circular measuring disk MS. It is fitted immovably, that is to say in a stationary manner, directly in front of the entry opening EO of the stranding nipple VN1. The guide opening FO of this measuring disk MS is rounded off in a curved shape radially inwardly, in order as far as possible to avoid damage to the sensitive elongated product LG. By virtue of the direct proximity to the hypothetical point at which the elongated product LG runs onto or sits on the outer circumference of the product being processed VP (=stranding point), the situation is largely avoided where the elongated product runs in at the stranding point under the influence of additional forces, such as additional frictional or centrifugal forces, which are not simultaneously measured. Rather, by means of the measurement as close as possible to the hypothetical stranding point, it is largely ensured that the tensile stress force, which is actually becoming effective on the elongated product LG, can be measured essentially fault-free, that is to say exactly as possible, directly before the application of the product or element LG to the product being processed VP.

Figure 7:
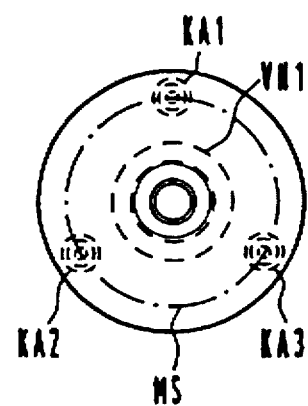
FIG. 7 is an end view of the left end of the of FIG. 6.

The measuring disk MS is fastened to the carrying part TT at three points via three individual force pickups, that is to say the measuring disk MS rests on three force meters uniformly distributed in the circumferential direction. In the cross-sectional view of FIG. 6, for reasons of simplicity only two force meters or force pickup KA1 and KA3 are illustrated. In the circumferential direction, that is to say in an image plane folded out by 90° in relation to the drawing plane of FIG. 6, as shown in FIG. 7, the three force pickups KA1, KA2 and KA3 are indicated schematically with dash-dotted lines. The force pickups KA1 to KA3 are in this case preferably located offset in relation to one another by 120°, considered in the circumferential direction. They form a low-tilt, largely stable measuring plane which makes possible a uniform distribution of the tensile stress force engaging on the measuring disk MS between the three associated pressure force pickups KA1 to KA3.

The elongated product LG, which is deflected in the direction of the product being processed VP in the guide opening FO, as it is running around on the inner rim of the guide opening FO of the measuring disk MS, exerts an axial force component on the measuring disk MS. As a result, the measuring disk or the measuring ring is displaced concentrically in relation to the product being processed VP, along the axial draw-off axis AR1, and in so doing presses on the force pickups KA1 through KA3. During a 360° revolution, three axial force components are thus measured independently of one another by the three force pickups KA1 through KA3. The sum of these three measured axial forces is likewise constant given a constant tensile stress F on the circulating elongated product LG. With a low delay, that is to say directly without significant loss of time, a measuring signal which is proportional to force can be made available for further evaluation. In this way, in each case the sum signal from these three axial forces obtained during one revolution can be compared, for example, with a prescribable desired value signal for the tensile stress force F.

If more than one elongated product is fed to the measuring probe according to FIG. 6, the individual tensile stress for each elongated product can nevertheless advantageously be measured separately or selectively from one another. For this purpose, the measuring signals brought about on the respective measuring sensor, such as KA1, for example, are sampled in accordance with the chronological sequence of the rotating elongated products. In the case of, for example, two elongated products to be measured, these are preferably assigned circumferential positions offset by 90° on the inner circumference of the guide opening FO of the measuring disk MS at the respective measuring time, that is to say in each case at the time of measurement of the tensile stress of the one product to be measured using one of the three force sensors, the other product to be measured is located in a circumferential position offset by 90°. The measuring signals for the second elongated product are then in each case detected one quarter revolution later than the measuring signals for the first product to be measured by the three force sensors KA1 through KA3, in sequence, and are provided for further evaluation. As a result of this 90° offset, the instantaneously not measured elongated product is in each case located at right angles to the current instantaneous measurement axis. Any influence on the elongated product respectively just measured using one of the force pickups KA1 through KA3 as a result of the rotary motion of the other second product to be measured is in this way largely avoided.

In the case of three or more revolving products to be measured, the force sensors KA1 through KA3 are expediently sampled in accordance with the above measurement principle in such a way that in each case only one of the products to be measured is measured by in each case one of the force pickups. The other products to be measured are in this case preferably located, at the respective measurement time, at circumferential positions which do not coincide with that of the force pickup.

Since the measuring probes corresponding to FIGS. 4 to 6 in each case react to a large extent with little delay to changes in the tensile stress force of the elongated product LG, a particularly rapid tensile stress determination is advantageously made possible. This applies preferably even in the case of very low tensile stresses, in particular when starting and stopping the wrapping process for the respective product being processed. In particular, using the measuring probes according to the invention and in accordance with FIGS. 4 through 6, tensile stresses of the elongated product LG of even less than 100 cN, in particular of at most 50 cN, can be detected or measured. The measuring probe according to the invention operates satisfactorily even at tensile stress fluctuations of more than 10 cN. Hence, any possible measurement error remains preferably at a maximum of 5%. This plays a not insignificant role, in particular in the case of winding devices in cable technology. There, particularly high requirements are placed on the exact as possible observance of a specific tensile stress.

Various variations of such winding devices are explained in more detail below using FIGS. 8 through 15. In each case they have a measuring device according to the invention, preferably in accordance with FIGS. 4 to 7. Elements taken over unchanged from FIGS. 4 to 7 and parts with mutually corresponding function and mode of operation are in each case provided with the same reference symbols in the following explanations of FIGS. 8 to 15.

Figure 8:
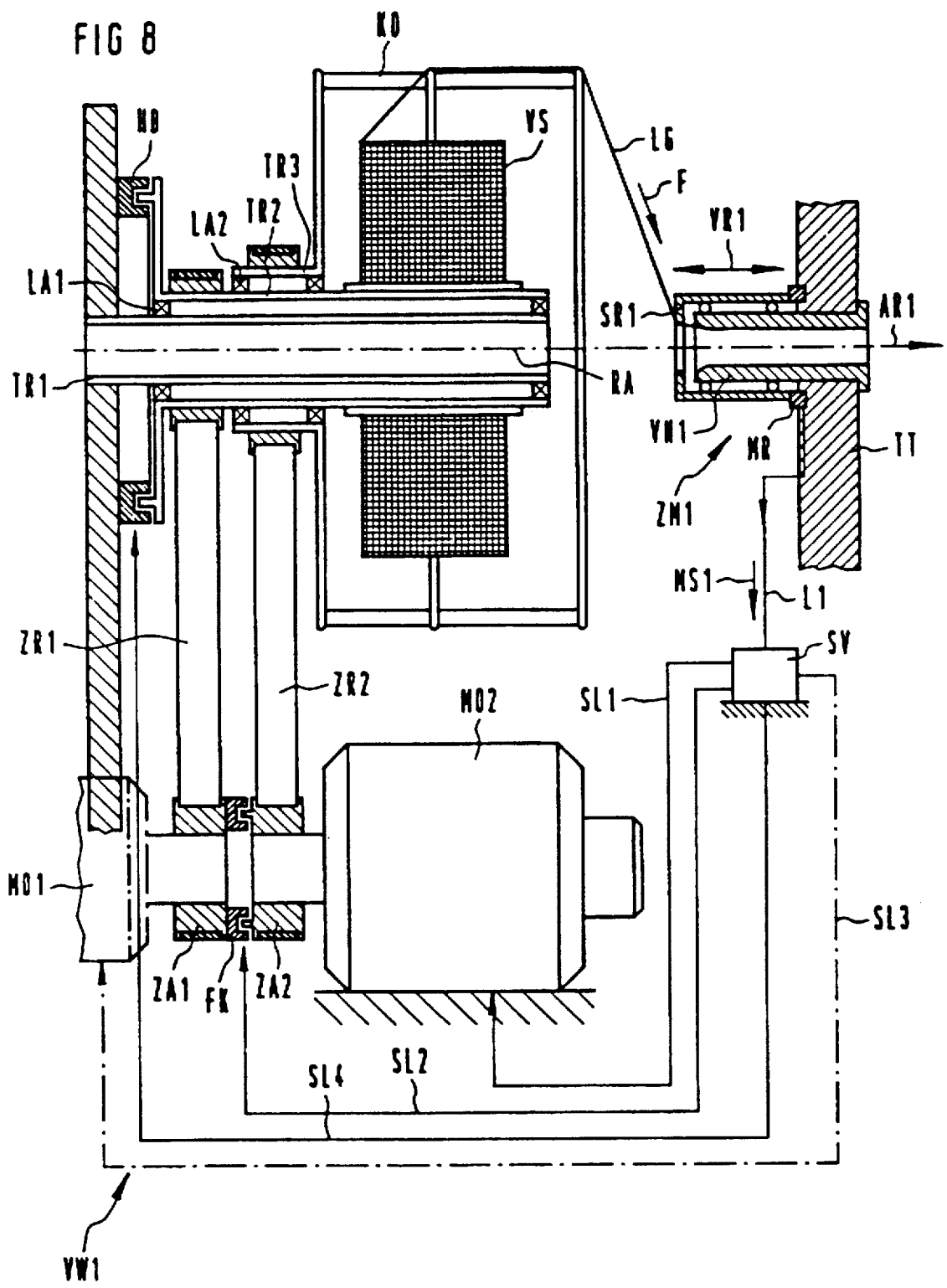
FIG. 8 is a schematic side view with portions in cross section of a winding device using the measuring probe of FIG. 4.

The arrangement of a retaining spiral winder VW1 in FIG. 8, which arrangement rotates about a common axis of rotation RA and has a concentrically constructed of a rotationally symmetrical design, has as components an inner, stationary carrying element or carrying tube TR1. By virtue of an approximately circularly cylindrical passage bore, the product being processed VP is passed through centrally. Mounted on this carrying tube TR1 by means of bearings LA1 is a further, in particular approximately circularly cylindrical, carrying tube TR2, which is mounted concentrically and such that it can rotate about the axial draw-off axis AR1. The supply coil VS is firmly seated on this carrying tube TR2 at the end, viewed in the draw-off direction AR1. The carrying tube TR2 is in turn concentrically surrounded by a further, outer carrying tube TR3 for an unwind device KO, in particular a cage (flyer). The unwind device KO is rotatably mounted via bearings LA2 on the carrying tube TR2 so as to rotate in the circumferential direction about the axis of rotation RA. The rotating unwind device KO is thus suspended concentrically in relation to the rotating supply coil VS, so that an "intrinsically nested" arrangement of supply coil and unwind device results.

The unwind device KO is allocated an independent drive device MO2, in particular a three-phase or alternating current motor. Via a toothed wheel ZA2 with associated toothed belt ZR2, the motor sets the carrying tube TR3 and hence the unwind device KO into rotation. Coupled to this drive device MO2, via a friction clutch FK, is a drive (comprising a toothed wheel ZA1 with associated toothed belt ZR1) for the carrying tube TR2 of the supply coil VS, so that the supply coil VS is also set into rotation. Furthermore, the carrying tube TR2 for the supply coil VS can be braked in a deliberate manner with the aid of a stationary braking device HB, in particular a hysteresis brake, arranged on the inlet side. The carrying tube TR2 has for this purpose on the inlet side a radially outwardly projecting annular rim which engages into an annular running groove on the outer circumference of the hysteresis brake.

From the supply coil VS, the elongated product LG is drawn off with the aid of the unwind device KO and fed to the stranding nipple VN1, for example via the measuring device ZM1 of FIG. 4, which is arranged concentrically with the stranding nipple VN1. The measuring device ZM1 is therefore arranged after the unwind device KO, viewed in the passage direction. The pressure forces brought about on the annular force sensor MR in accordance with the designs of FIG. 4 because of the axial displacement travel of the measuring probe SR1, under the action of the tensile stress of the elongated product LG, are converted in the force sensor MR into electrical measuring signals MS1 and are communicated via a line L1 to an evaluation/control device SV. This evaluation/control device SV compares the respectively preferably continuously incoming actual value measured signals MS1 with a prescribable desired value and, from their difference, derives control signals for driving the supply coil VS and/or the unwind device KO. It may also be expedient to acquire the measured values for the tensile stress force digitally, that is to say for each revolution period of the elongated product in the measuring probe, to forward more than one sampled value to the evaluation/control device SV. For example, the drive device MO2 for the unwind device KO may be driven via a control line SL1. The friction clutch FK may be controlled via a control line SL2 by the evaluation/control device SV, that is to say the degree of coupling between the two drives for the supply coil VS and the unwind device KO may be set in a defined manner. Moreover, the braking device HB for the supply coil VS can be influenced in a deliberate manner via a control line SL4. This is preferably expedient in the case of a rigid coupling between the unwind device KO and the supply coil VS via the friction clutch FK.

Because of the coupling of the drive for the supply coil VS via the friction clutch FK to the drive device MO2 for the unwind device KO, the supply coil VS follows the rotary motion of the unwind device KO substantially simultaneously, that is to say synchronously, in the same direction of rotation. Expediently, the ratio of the rotational speeds of supply coil and unwind device are set in such a way that the supply coil VS rotates with a greater speed of revolution than the unwind device KO. By this means, the elongated product LG is drawn off from the supply coil VS largely without loading, that is to say with as low a tensile stress as possible. In some cases it can then already be sufficient merely to drive the braking device HB via the control line SL4 in a deliberate manner from the evaluation/ control device SV and to brake the supply coil VS in a defined manner, in order to be able to maintain a defined tensile stress F for the elongated product LG. In the case of such a braking/drive combination, the supply coil is thus preferably torque-controlled via the control line SL2 by the evaluation/control device SV. In addition, or independently thereof, the drive device MO2 can likewise be torque-controlled via the control line SL1 by the evaluation/control device SV.

It is of course also possible, instead of the friction clutch FK, to provide an independent drive device MO1, in particular a torque motor, also for the supply coil VS on its own. This drive device MO1 is indicated with a dash-dotted line in FIG. 8. Via a control line SL3, drawn with a chain-dotted line, it is likewise controlled in a defined manner by the evaluation/control device SV as a function of the respectively measured tensile stress force. In particular, the two drive devices MO1 and MO2 are torque-controlled with the aid of the evaluation/control device SV.

If appropriate, rotational speed control of the two drive devices MO1, MO2 may be expedient. In this case, the braking device HB, drawn in FIG. 8, for the supply coil may optionally be omitted. Instead of the braking device HB, the drive device MO1 is provided for the supply coil VS, and is controllable in terms of its rotational speed (speed-controlled). The drive device MO1 can thus be retarded or accelerated in a defined way in the manner of a so-called 4Q drive. The same is also preferably true for the drive device MO2.

If appropriate, it can also be expedient to exchange the assignments of the drive and braking devices relating to the supply coil and to the unwind device.

The evaluation/control device SV is therefore coupled back in an advantageous manner to the respective drive device MO1, MO2, FK and/or the braking device (such as HB) of the unwind device and/or of the supply coil VS. By this means, in the case of the forward retaining spiral winder VW1 of FIG. 8, the tensile stress of the elongated product, in particular when running up or when switching off the stranding device, can be maintained in a defined manner, that is to say without impermissibly high tensile stress fluctuations. The measured value MS1, which is in each case directly proportional to the actual tensile stress F, is therefore advantageously used for controlling the circulating speed or the rotational speed of the unwind device KO and/or of the supply coil VS. Moreover, using the measuring device according to the invention, it is possible for tears or breakages of the elongated product LG to be detected immediately and, if appropriate, for the plant to be stopped.

By way of example, the following control scheme may be expedient for satisfactory operation:

A desired value tolerance range for permitted tensile stress values of the elongated product is prescribed or defined with a lower limit and an upper limit. If the upper limit is exceeded, then the elongated product LG is being loaded or acted on by too high a tensile stress. In order to reverse this as rapidly as possible, the evaluation/control device SV instructs, for example, the braking device HB via the control line SL4, to brake the supply coil VS less severely, that is to say the rotational speed or the speed of rotation of the supply coil VS is increased in relation to the rotational speed of the unwind device. If the lower limit is violated, then too large a quantity of the elongated product LG is running off from the supply coil VS, that is to say the elongated product LG is resting with too low a winding tension on the product being processed VP or, in the worst case, the formation of tangles may even occur, in the event that more elongated product LG is being unwound from the supply coil VS than is being carried along by the product being processed VP in the axial direction AR1. Therefore, for example, the braking device HB is instructed by the evaluation/control device SV via the control line SL4 to brake the rotating supply coil VS more severely, that is to say to reduce the speed of rotation of the supply coil VS or to slow down the rotating supply coil. Hence, the elongated product LG once more has a sufficient tensile stress applied to it. In this way, the elongated product LG may be applied to the product being processed VP with a defined tensile stress within a narrow tolerance range. In particular, the control permits the setting of a substantially constant, steady tensile stress force for the elongated product LG. This is because any rising above or falling below the prescribable tolerance range triggers appropriate compensating reactions immediately, that is to say with little delay. It is preferably made possible for disturbing variables to be compensated, or eliminated, in the ms range, in particular within 2 to 10 ms. In this manner, it is made possible in an advantageous manner to wrap the stranding product VP, in particular an optical fiber bundle, with the elongated product with a tensile stress which is as uniform as possible and/or as low as possible. This is made possible in a satisfactory manner even at very high speeds of rotation, in particular of more than 1500 rev/min.

In FIGS. 9 through 15, the evaluation/control device SV of FIG. 8 with its associated control lines has in each case been left out for reasons of clarity. The drive/braking devices in FIGS. 9 through 15 are of course also controlled using an appropriate evaluation/control device.

Figure 9:
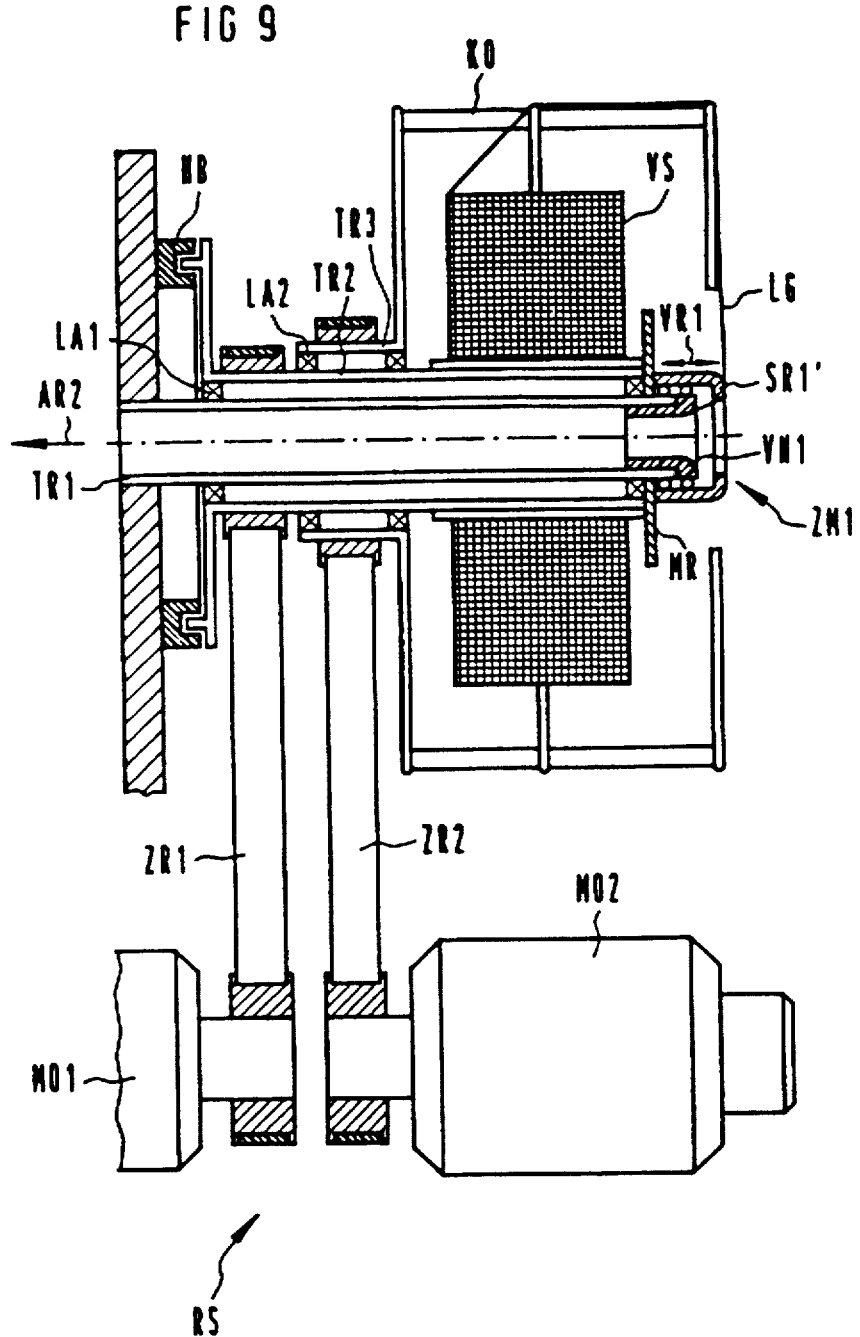
FIG. 9 is a schematic side view with portions in cross section of a first embodiment of the winding device of FIG. 8.

FIG. 9 shows in schematic form a reverse retaining spiral winder RS, in which as distinct from FIG. 8 the product being processed is now being drawn through in the opposite direction AR2, that is to say counter to the original draw-off direction AR1 of FIG. 8, and hence "backwards" through the inner carrying tube TR1. For this reason, the measuring device ZM1 of FIG. 4 is now firmly mounted conversely to its orientation in FIG. 8 on this inner, stationary carrying tube TR1 on the inlet side (that is to say in the right half of the figure). Otherwise, the mode of operation of this spiral winder RS according to the invention is carried out in a manner analogous to the forward spiral winder VS1 of FIG. 8.

Figure 10:
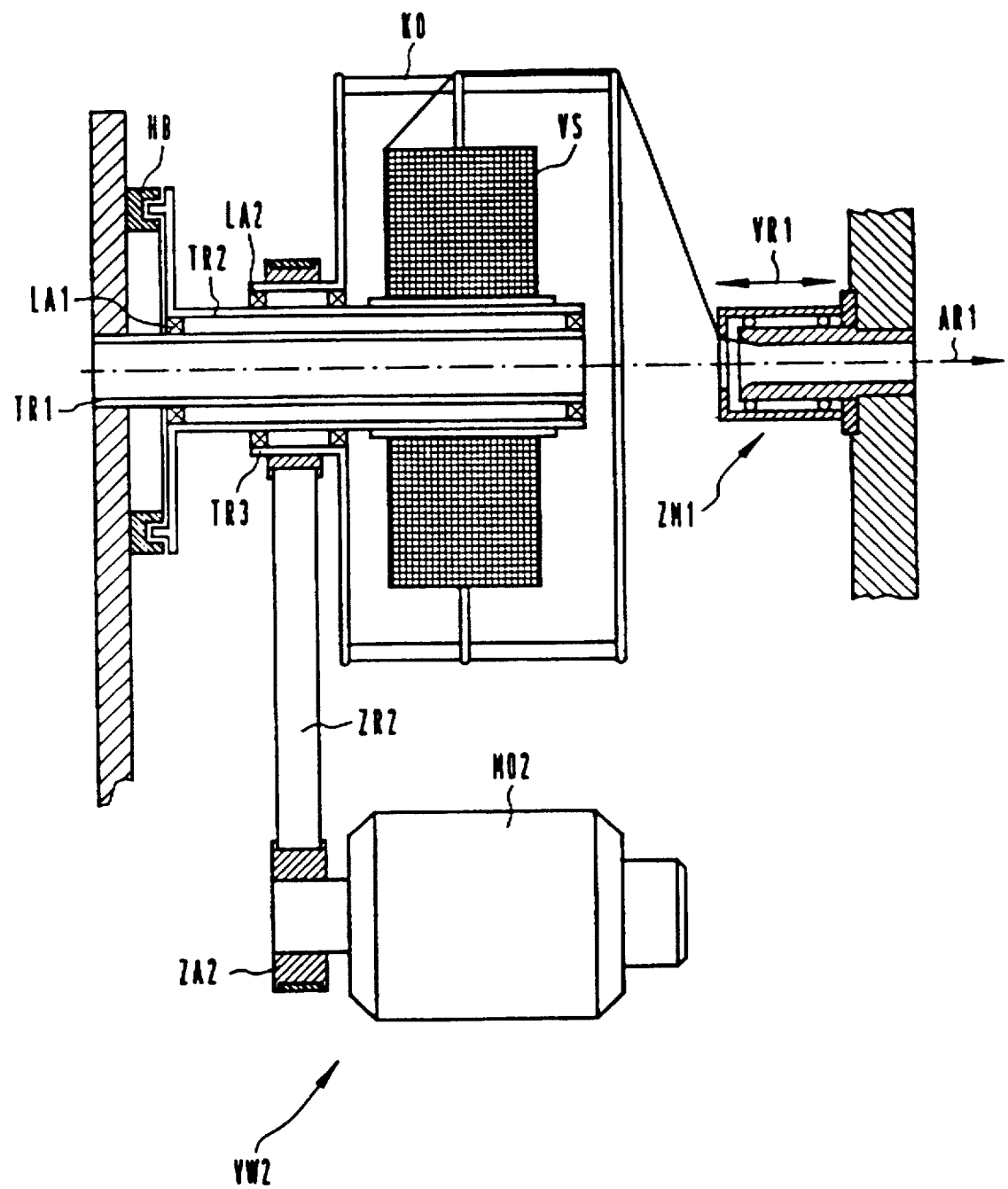
FIG. 10 is a schematic side view with portions in cross section of a second embodiment of the winding device of FIG. 8.

FIG. 10 shows a further forward spiral winder VW2 as a modification of the spiral winder VW1 according to FIG. 8. In FIG. 10, as distinct from FIG. 8, the direct drive MO1 for the supply coil VS and, respectively, the indirect (coupled) drive comprising the toothed wheel ZA1, the toothed belt ZR1 and the friction clutch FK have been left out. Rather, in FIG. 10, the supply coil VS is automatically carried along merely via the bearing friction of the bearing LA2 between the carrying tube TR3 of the unwind device KO and the carrying tube TR2 of the supply coil VS, in an indirect manner in the direction of rotation of the unwind device KO. In this way there is formed a drive/brake combination, which is of particularly simple construction, of the unwind device KO and the supply coil VS.

Figure 11:
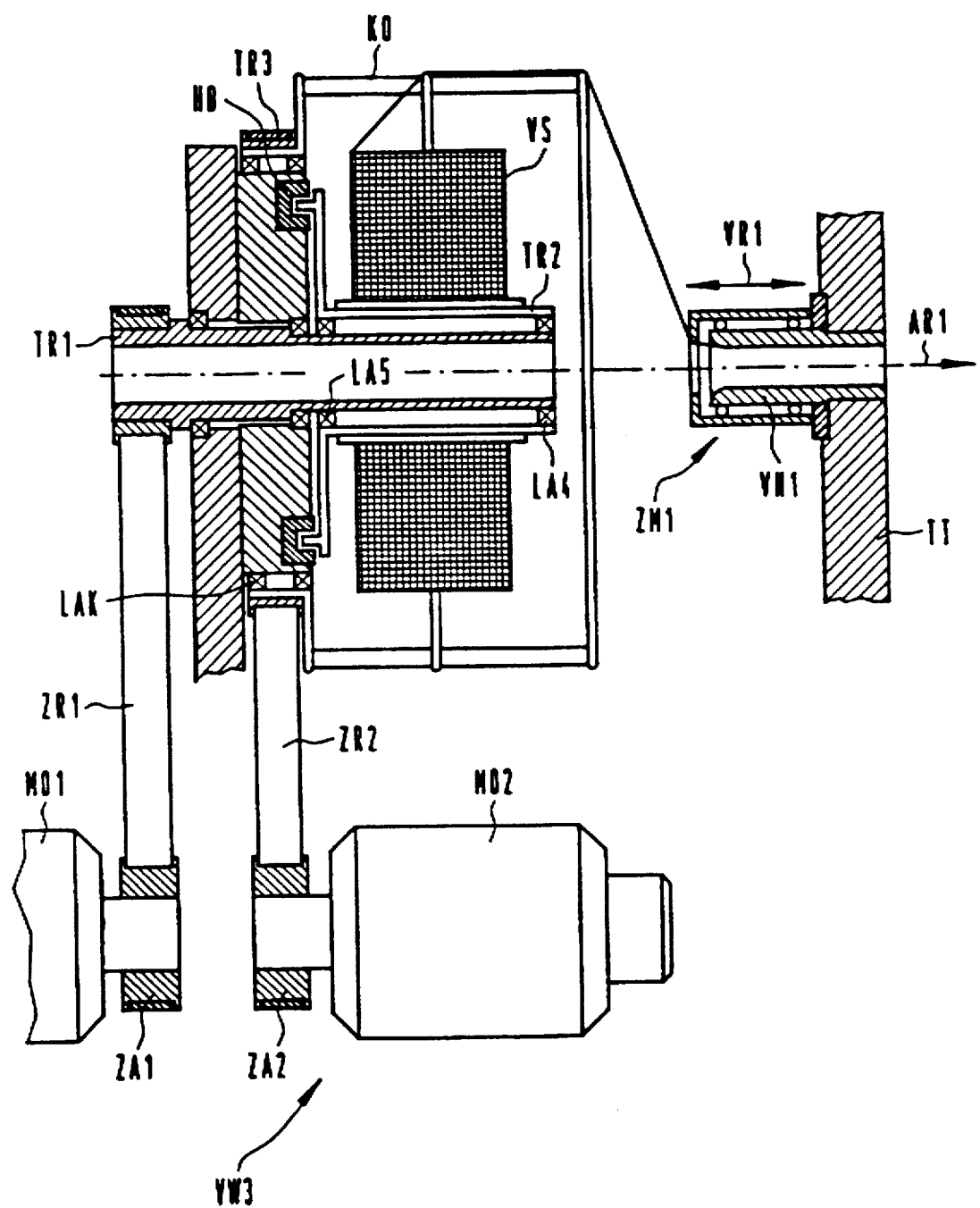
FIG. 11 is a schematic side view with portions in cross section of a third embodiment of the winding device of FIG. 8.

FIG. 11 shows a further modified forward retaining spiral winder VW3. As distinct from the retaining spiral winder VW1 of FIG. 8, the inner carrying tube or the hollow spindle TR1 is now suspended in a rotatable manner. The separate drive device MO1 is now assigned to this inner carrying tube TR1 and not to the carrying tube TR2 of the supply coil VS, as in FIG. 8. In FIG. 11, the supply coil VS is carried along automatically and indirectly merely via the bearing friction of bearings LA4, LA5 between the carrying tube TR2 and the inner carrying tube TR1, in the direction of rotation of the latter. In this case the unwind device KO is suspended via bearing LAK so as to be rotatable with respect to the braking device HB. This makes a particularly simple, constructionally separated construction of the retaining spiral winder VW3 possible, since the braking device HB can be arranged in a manner offset inwardly in constructional terms into the unwind device KO.

Figure 12:
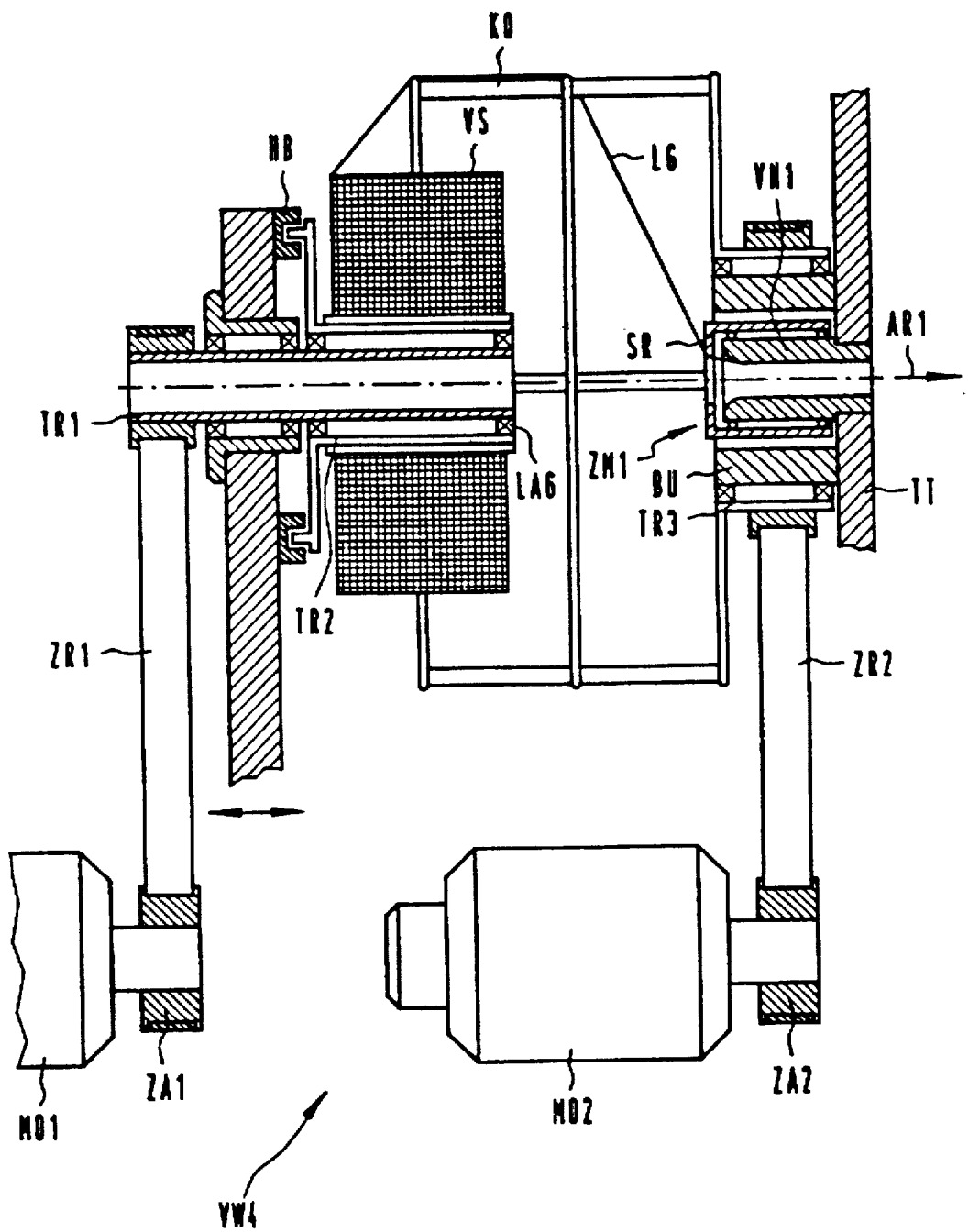
FIG. 12 is a schematic side view with portions in cross section of a fourth embodiment of the winding device of FIG. 8.

FIG. 12 shows a further forward spiral winder VW4, modified in relation to FIG. 8, in which the unwind device KO and the supply coil VS are mounted opposite each other. On the inlet side, the inner carrying tube TR1, which is now rotatably suspended, is actuated with the aid of the separate drive device MO1. The carrying along of the supply coil VS is carried out merely via the bearing friction of the bearing LA6 between the carrying tube TR2 of the supply coil VS and the inner carrying tube TR1. On the outlet side, the measuring device ZM1 of FIG. 12 is now situated in a stationary manner in an additional bush BU on the stationary carrying part TT. The carrying tube TR3 for the unwind device KO is rotatably mounted on the outside on this bush BU. As distinct from FIG. 8, the unwind device KO in FIG. 12 is therefore suspended with the converse orientation. Its drive is carried out once more via the drive MO2 in accordance with the designs of FIG. 8. There is thus formed a structurally drawn apart arrangement whose individual components are freely accessible. In addition, sufficient space is advantageously created between the supply coil VS and the measuring device ZM1, in order if appropriate to additionally hold in reserve a further supply coil in the unwind device KO.

Figure 13:
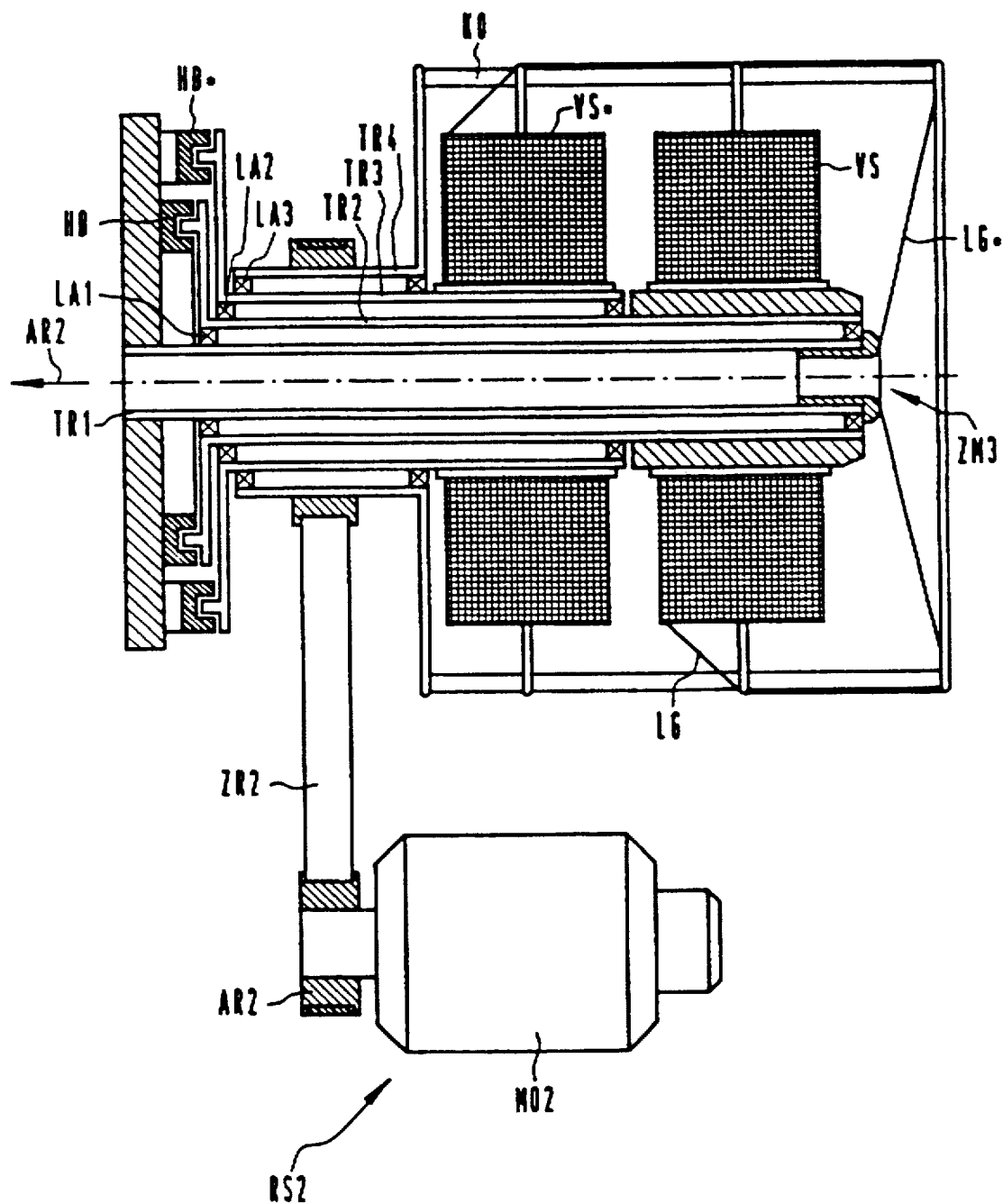
FIG. 13 is a schematic side view with portions in cross section of a winding device using the measuring probe of FIG. 6.

Finally, in a modification from FIG. 9, FIG. 13 shows a double spiral winder RS2 for a dual wrapping of the product being processed. For this purpose, two supply coils, VS, VS* are connected in series one behind the other. The additional supply coil VS* is seated firmly on the carrying tube TR3 of FIG. 9, which is lengthened in the axial direction, behind the supply coil VS as viewed in the draw-off direction AR2. In this arrangement, the additional supply coil VS* is assigned a separate braking device HB*, which is arranged concentrically with the braking device HB of FIG. 9. For the unwind device KO, there is provided concentrically on the outside about the carrying tube TR3 an additional further carrying tube TR4, which is suspended by means of bearing LA3 so as to be rotatable with respect to the carrying tube TR3. The unwind device KO is in this case firmly seated on the carrying tube TR4. Starting from the innermost carrying tube TR1, which is arranged in a stationary manner, the carrying tube TR2 is arranged concentrically over the tube TR1 by means of bearing LA1, the carrying tube TR3 is suspended over the tube TR2 by means of bearing LA2 and, finally, the carrying tube TR4 is suspended over the TR3 by means of bearing LA3, all suspensions being concentric and rotatable. In this manner, the elongated product LG can be fed from the supply coil VS and the elongated product LG* can be fed from the supply coil VS*, in each case separately with the aid of the unwind device KO, to a measuring device according to the invention and in accordance with FIGS. 4 to 6 for the separate determination of their respective tensile stress. Preferably, the evaluation of the measuring signals and the regulation or control of the tensile stress of the respective elongated product LG, LG* is carried out selectively in accordance with the designs of FIGS. 6 and 8. In the case of this staggered arrangement of FIG. 13, the supply coils VS, VS* are in each case carried along in the respective direction of rotation merely passively via the bearing friction of the bearings LA3, LA2 and LA1. By contrast, the unwind device KO is actively driven using the drive device MO2 via the carrying tube TR4.

In FIG. 13, the measuring device ZM3 according to FIG. 6 is preferably rigidly fastened on the inlet side of the inner, stationary carrying tube TR1. For the purpose of the separate determination and provision of a measured variable for the respective tensile stress of the elongated part LG or LG*, a sampled evaluation is expedient. For this purpose, in each case the elongated product LG or LG* to be measured is detected in its angular position. At that time at which the respective elongated product is sweeping past the force pickup KA1 through KA3 in accordance with FIG. 6 and which may be predetermined for the cycled measurement, the measured value which is picked up at that time is compared with the desired value prescribable for this pickup. The respectively formed desired/actual value difference is used for the separate regulation of the speed of rotation of the individual supply coils VS, VS* and of the unwind device KO.

For a dual wrapping of the product being processed, the two elongated products LG, LG* are preferably guided offset in relation to each other by 180° in the circumferential direction, in order to be able to set the most uniform distances from each other. In this case, the radial forces on the measuring device ZM3 cancel out in an advantageous manner.

If appropriate, it may also be expedient to assign the supply coil VS, the supply coil VS* and the unwind device KO, in addition or independently herefrom, separate drive devices in each case.

Preferably, the dual spiral winder RS2 of FIG. 13 can also be operated in such a manner that the product being processed is wound around with a crossed spiral. For this purpose, the two supply coils VS, VS* expediently rotate with mutually different directions of rotation.

The arrangement of FIG. 13 is preferably also transferrable to operating with more than two supply coils, a separate control for each supply coil then being carried out in accordance with the above explanations.

Figure 14:
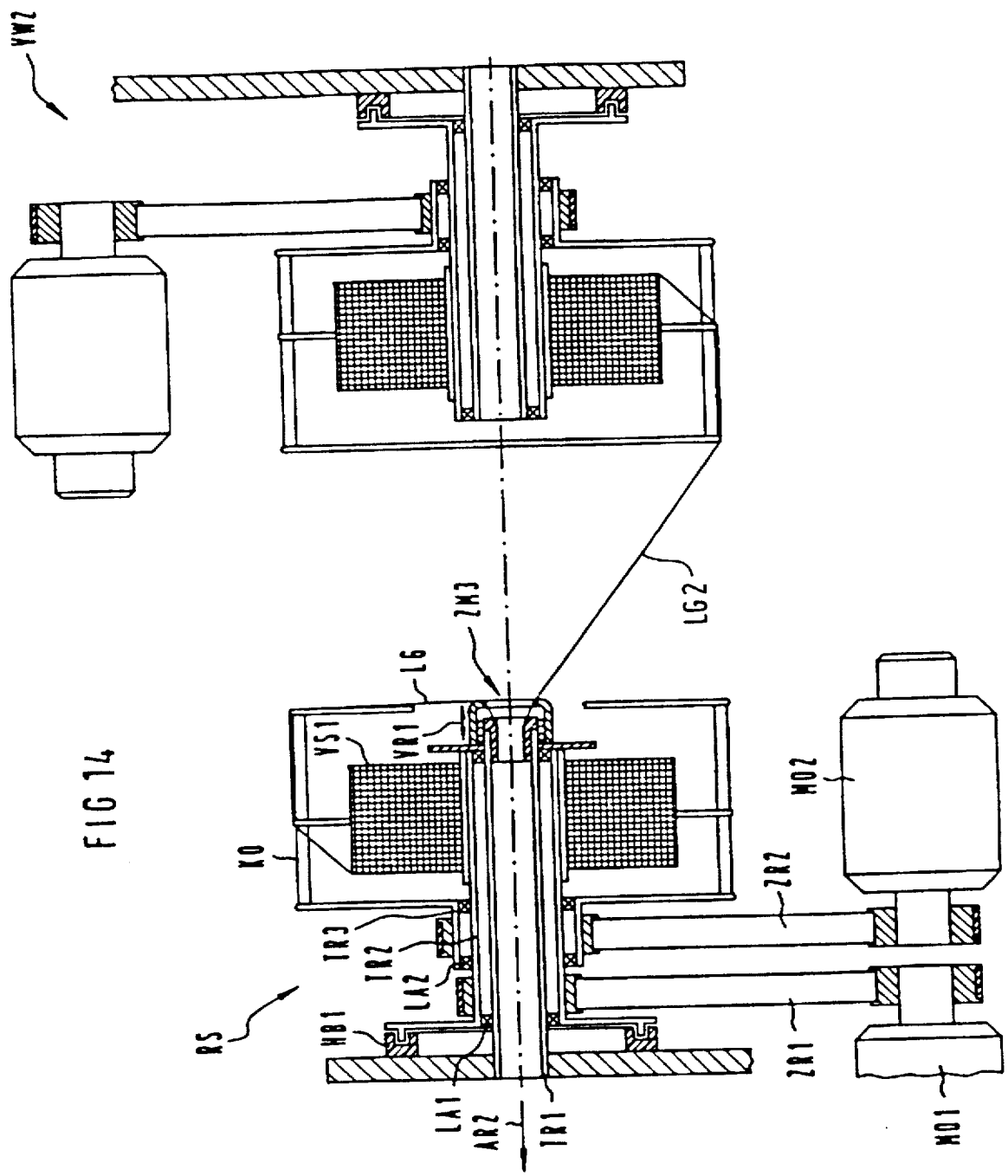
FIG. 14 is a schematic side view with portions in cross section of a device using a combination of the winding device of FIGS. 9 and 10.

FIG. 14 finally shows a combination of the forward spiral winder VW2 of FIG. 10 and the reverse spiral winder RS, arranged thereafter in the draw-off direction AR2, of FIG. 9. The reverse spiral winder RS in this case operates, for example, with the measuring device ZM3 according to the invention and in accordance with FIG. 6. For reasons of simplicity, in the case of the forward spiral winder VW2 the reference symbols have been left out. The elongated product, drawn off from its supply coil, is now designated by LG2 to avoid confusion. The tensile stress forces of the two elongated products LG2 (from the supply coil VS of the spiral winder VW2) and LG (from the supply coil VS of the reverse spiral winder RS) are preferably fed through one and the same tensile stress measuring device in the spiral winder RS for the separate measurement of their tensile stress forces. For this purpose, the two elongated products LG, LG2 are preferably assigned to one another offset by 90°, viewed in the circulation direction, in the guide opening of the measuring device ZM3 of FIG. 6 according to the invention. In particular, the two retaining spiral winders RS and VW2 are operated with opposing directions of rotation, so that the two elongated products LG, LG2 can be applied to the product being processed in the manner of a crossed spiral. As a result of the preferably 90° offsetting of the two elongated products LG, LG2, viewed in the circumferential direction, the respective elongated product can be measured at a specific, associated force sensor, while the other elongated product is located at right angles to the current measurement axis and hence the measuring signal of the first elongated product, just measured, remains substantially uninfluenced.

Figure 15:
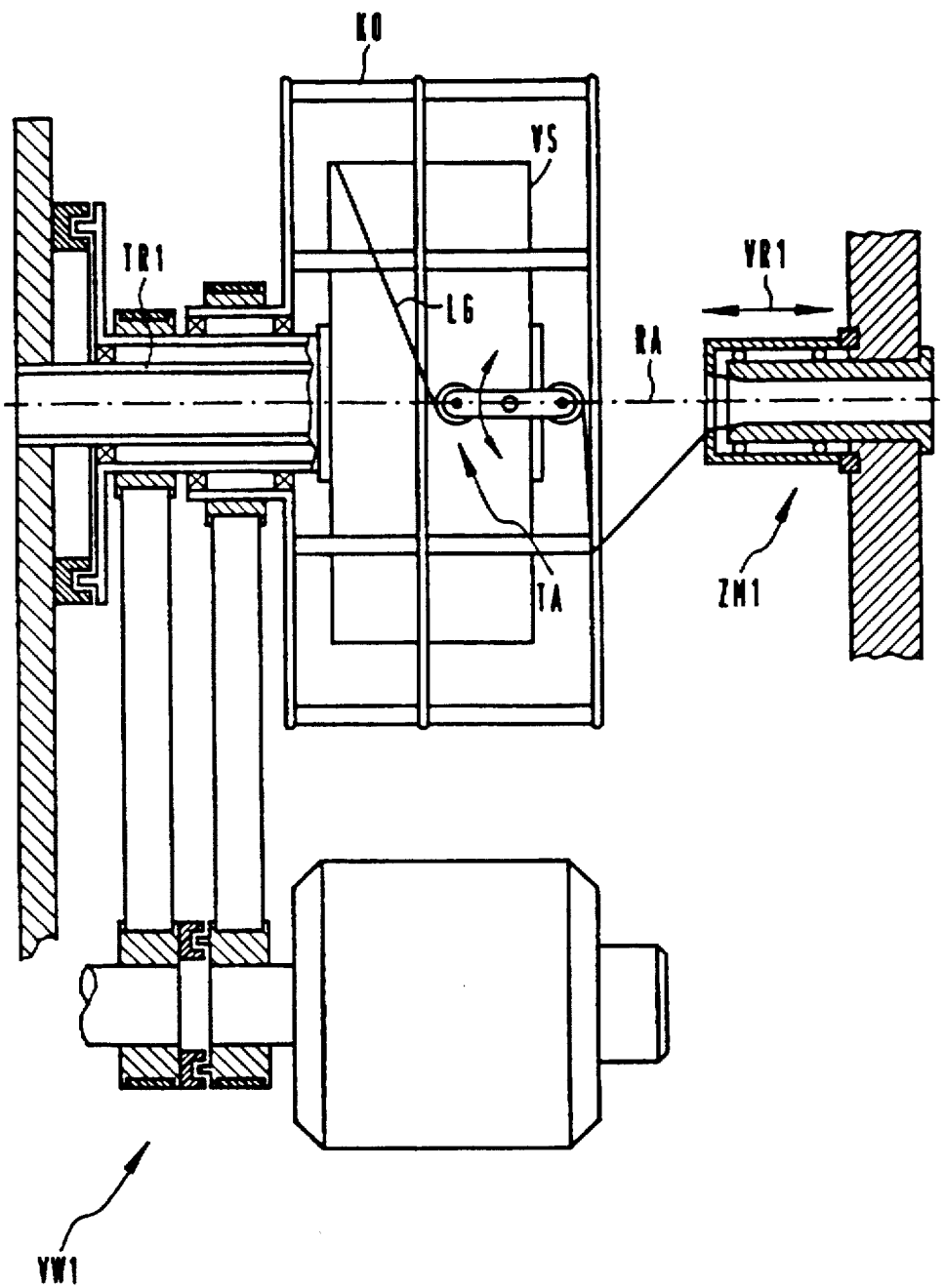
FIG. 15 is a schematic side view with portions in cross section of a modification of the winding device of FIG. 8.

In FIG. 15, in the case of the spiral winder VW1 of FIG. 8, a dancer device TA is additionally provided. Only the essential reference symbols from FIG. 8 have been taken over, while the other reference symbols there have been left out for reasons of clarity. The dancer device TA is accommodated in the revolving, rotating unwind device KO. In this case, for example, it may be fitted on the outlet end of the stationary carrying tube TR1. The elongated product LG is guided over the dancer device TA between the point where it is lifted off from the supply coil VS and before leaving the unwind device KO. The axis of rotation of the dancer device TA is preferably located approximately parallel to the axis of rotation RA of the unwind device KO. In this case the dancer device TA is suspended in such a way that it can pivot out axially transversely with respect to the axis of rotation RA. This makes it possible, supporting the control system according to the invention, to further compensate for any high-frequency tension fluctuations of the elongated product LG, which may possibly no longer be sufficiently rapidly eliminated because of the response times of the control system. The dancer device TA is in particular designed to have a low mass. The dancer device TA may, for example, be deflected by any airstream produced during the rotation of the components of the plant, or may be deflected by the tensile stress of the elongated product.

Figure 16:
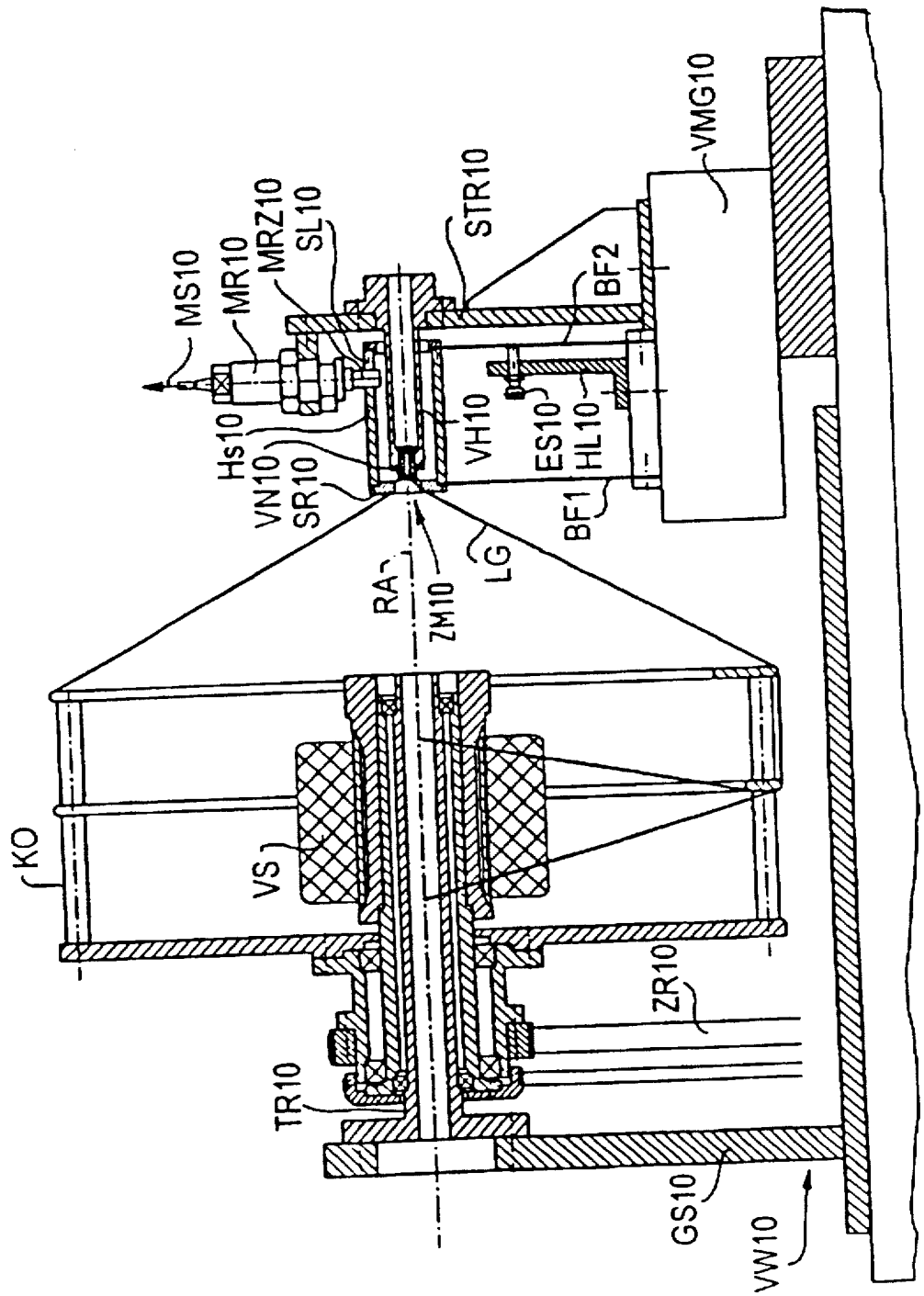
FIG. 16 is a cross sectional view with portions of elevation of construction and arrangement of a measuring probe, configured in accordance with the invention, in the context of a stranding device.

In FIG. 16, as an application example of the invention, a retaining spiral winder VW10 is shown which applies elongated product LG, for example in the form of a thread, ribbon or the like, to a cable core, not represented here, and by this means holds the wires or elements of this cable core together. For this purpose, a carrying tube TR10 is fastened to a stationary frame GS10, on which carrying tube TR10 an unwind device KO, for example in the form of a cage or flyer, is rotatably mounted on the outside. Provided in the interior of the unwind device KO is a supply coil VS or cops, from which the elongated product LG is drawn off and fed to a stationary stranding nipple VN10. The nipple VN10 is structurally connected to a stranding and measuring frame VMG10, and the axis of the winding device VW10 and of the stranding nipple VN10 are in alignment. The stranding nipple VN10 is connected via a sleeve VH10 to the stranding and measuring frame VMG10. The product to be stranded runs (in a manner not shown here) from left to right through the bore in the carrying tube TR10 and passes to the stranding nipple VN10. Upstream of the retaining spiral winder VW10 there are provided appropriate standing devices (not shown here), in particular those such as operate with alternating direction of lay (SZ stranding), such as tube accumulators. The elongated product LG runs into the stranding nipple VN10 together with the stranding elements guided along the stranding axis RA.

In order to determine the tensile stress of the elongated product LG being applied as a retaining spiral, the tensile force measuring device ZM10 is used. The device ZM10 has a sleeve HS10, to which a ring or a disk SR10 is fastened on the inlet side, through which ring SR10 the elongated product LG is guided. The sleeve HS10 is held by two leaf springs BF1 and BF2 which are essentially parallel and extend in the radial direction and which are fastened on the measuring and stranding frame VMG10. Given a corresponding pull on the elongated product LG, this makes possible a movement of the ring SR10 and hence of the sleeve HS10 in a substantially axial direction RA. In principle, the use of only one leaf spring in this connection would also be conceivable; however this would have the disadvantage that a certain tilting movement of the ring SR10 could then occur. By contrast, in the case of using two leaf springs BF1 and BF2, which are essentially fastened to the two ends of the sleeve HS10, a displacement is largely possible only in the axial direction RA, depending on the magnitude of the tensile force which is exerted by the elongated product LG.

The elongated product LG winds onto the surface of the stranding bundle, not shown, as the product or element LG and bundle enters into the interior of the sleeve VH10 via the stranding nipple VN10 and emerges from the stranding and measuring frame VMG10 at the right-hand end. The sleeve H10 is retained via a strut STR10 on the base part of he stranding and measuring frame VMG10.

The distance between the two leaf springs BF1 and BF2 is expediently selected between 1 cm and 10 cm. The leaf springs BF1 and BF2 form, with their four respective end clamping points (two below, in each case on the stranding and measuring frame VMG10, and two above, on the sleeve HS10), a type of four-link system with the corresponding articulation points coinciding with the clamping points.

For the actual measured value detection, a non-positive connection in provided between the sleeve HS10 and hence the ring SR10, on the one side, and a measuring probe MR10. The present example the measuring probe MR10 has a radially extending pin MRZ10 which is engaged in a slot which extends in the direction of the longitudinal axis RA in the sleeve HS10. The pin MRZ10 rests in a non-positive manner on the base of this slot SL10 in the sleeve HS10, with the result that an axial tensile force on the elongated element LG also exerts a force acting on the pin MRZ10. The force is converted by the measuring probe MR10 into a measuring signal MS10 which can be used for the regulation of the drive, for example of the supply coils or cops, in order to stabilize the tensile stress on the elongated product LG within narrow limits.

The slot SL10 is designed in such a way that the pin MRZ10 of the measuring probe MR10 rests only on the bottom, that is to say the slot width is selected to be appropriately larger than the diameter of the pin. As a result, any small movements seen in the circumferential direction of the sleeve HS10 make no contribution to generating the measuring signal S10.

Since the leaf springs BF1 and BF2, together with the ring SR10 and the associated sleeve HS10, result to a certain extent in a structure which is capable of oscillation, there is provided on the stranding and measuring frame VMG10 a holding tongue HL10, on which there is held a setting screw ES10, which is provided with an appropriate rotational securing means. An end of the screw ES10 engages on one of the leaf springs, on the leaf spring BF2 in the present example, and imparts to the spring a specific prestress. This basic prestress of course also acts on the pin MRZ10 of the measuring probe MR10 and must be taken into account in terms of calculation in the formation of the measuring signal MS10 by this basic prestress being subtracted from the measuring signal generated by the measuring probe MR10.

It is therefore necessary to carry out a type of calibration procedure in the unstressed state of the elongated product LG, and to set the measuring signal to zero with the screw ES10 tightened.

Figure 17:
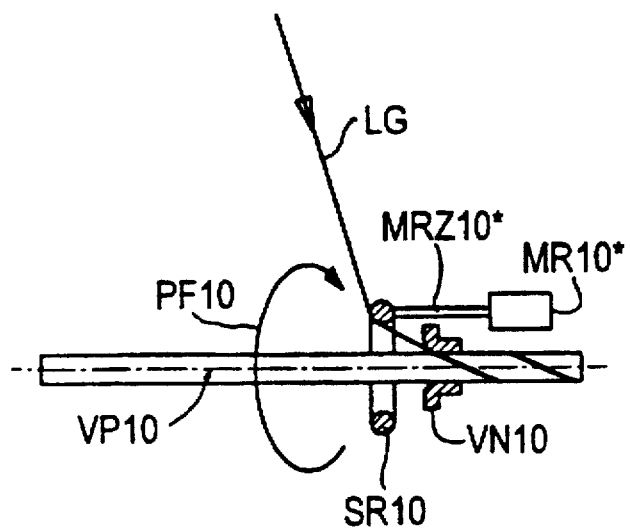
FIG. 17 is a schematic representation on an enlarged of the details of the construction of a measuring probe according to the invention.

FIG. 17 shows an enlarged partial extract from FIG. 16, which extract illustrates only the stranding nipple VN10 and the associated ring SR10, on which the elongated product LG, which is under tensile stress, is resting. Furthermore, FIG. 17 shows that the product being processed is a bundle VP10 in the form of a cable core or the like, which is intended to be held together by the elongated product LG, and the winding direction is indicated by the arrow PF10. The remaining configuration substantially corresponds to the arrangement of the stranding and measuring frame VMG10 according to FIG. 16, only the sensor MR10* with its pin MRZ10* is rotated by 90°. This means that the force which the elongated product LG exerts on the measuring ring SR10 engages axially on the force measuring sensor MR10*; whereas in FIG. 16 an axial engagement was envisaged. Which type of spatial arrangement of the measuring sensor MR10 or MR10* is selected depends on the respective structural conditions and, in particular, also on the space which is available.

Figure 18:
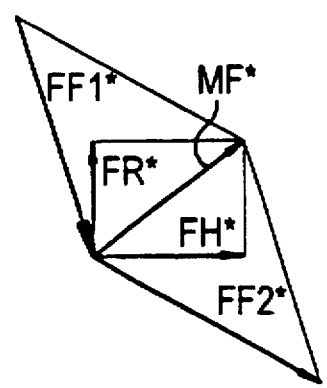
FIG. 18 is a force parallelogram to explain the force relationships occurring in the elongated product.

FIG. 18 shows a force parallelogram such as occurs in the region of the bearing surface of the elongated product LG according to FIG. 17 on the measuring ring SR10. In this case, FF1* and FF2* signify the stresses on the elongated product LG, and MF* represents the total force resulting therefrom which acts on the measuring ring SR10. This total force MP* may be separated into two partial forces FH* (viewed running in the direction of the stranding axis RA) and into a force FR* (running in the radial direction to RA). Given constant geometric relationships (defined by the unwind device KO), the force FH* is thus proportional to the force which is acting as a tensile force on the elongated product LG and hence reproduces the mechanical stressing of the elongated product LG. The force FH* influences both the measuring sensor or probe MR10* according to FIG. 17 and the measuring probe MR10 according to FIG. 16 and is thus used for generating the measuring signal MS10, with which the tensile stressing of the elongated product LG can be kept exactly at the desired value.

In many cases it is expedient or necessary to wrap the product being processed not only once but twice with an elongated product. The wrapping itself is in this case generally applied in a crossover manner, that is to say in opposite directions; however, multiple wrapping with an elongated product in the same direction is also possible.

Figure 19:
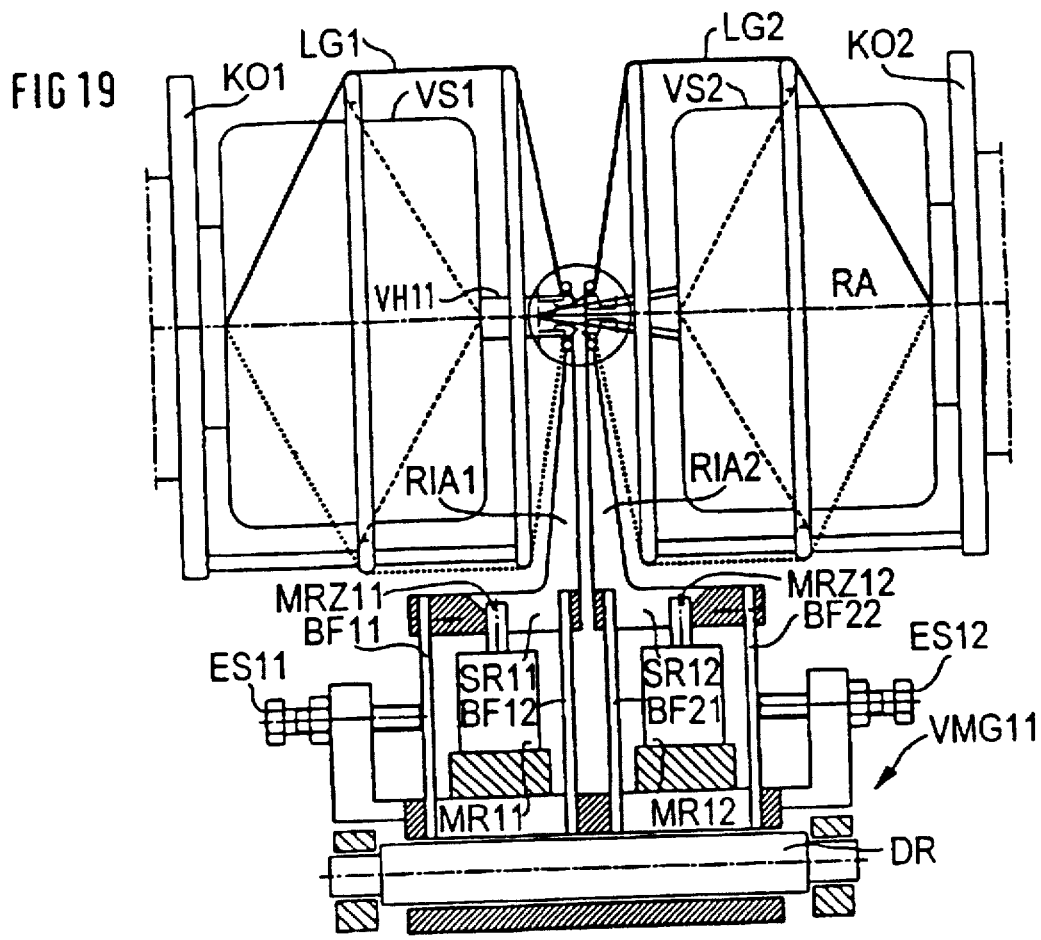
FIG. 19 is a side view with portions in cross section of a further stranding device with two-fold application of the elongated product and FIG. 20 is an enlarged cross sectional view of, details the region of the measuring probe according to FIG. 19.

FIG. 19 shows the configuration of such a wrapping device with the associated two unwind devices KO1 and KO2 with corresponding supply coils VS1 and VS2. The elongated product LG1 and LG2 is in each case drawn off in an opposite direction in relation to the stranding axis RA. The direction of rotation of the two unwind devices KO1 and KO2 is selected to be opposed if a crossed wrapping is desired. The stranding and measuring frame VMG11 is likewise of dual design, by contrast with the arrangement according to FIG. 16, and has two measuring probes MR11 and MR12 which are in each case provided with pins MRZ11 and MRZ12, furthermore two leaf springs BF11 and BF12 (belonging to the measuring probe MR11) and BF21 and BF22 (belonging to the measuring probe MR12) are provided. Also, two corresponding setting screws ES11 (assigned to the leaf spring BF11) and ES12 (assigned to the leaf spring BF22) serve for setting the basic prestress of the leaf springs and for the prevention of any fluttering movements, by generating an appropriate spring prestress.

By contrast with the approximately coaxial arrangement of the sleeve HS10 carrying the measuring ring SR10 in FIG. 16, the mechanical displacement elements in FIG. 19 are arranged outside the unwind device and eccentrically in relation to the latter. For this purpose, two ring holders RIA1 and RIA2 are provided, each of which is of approximately L-shaped design. The limb located on the outside in each case is connected to the leaf springs assigned in each case to one measuring probe. Fitted to the ring holder RIA1 are the leaf springs BF11 and BF12, whereas the leaf springs BF21 and BF22 engage on the ring holder RIA2. The pins MRZ11 and MRZ12 of the two measuring probes MR11 and R12 are likewise arranged in longitudinal slots SL11 and SL12, like they are in FIG. 16, and engage there in a non-positive manner on the ring holders RIA1 and RIA2, respectively, at the bottom at the end of the slots. The limb part which is substantially radially inwardly directed, that is to say toward the stranding axis RA, carries the annular measuring probes as will be explained in more detail using FIG. 20.

In order to facilitate the changing over of the entire arrangement, the stranding and measuring frame VMG11 is designed to be pivotable as a whole, for which purpose it is arranged on an axis of rotation DR which extends substantially parallel to the stranding axis RA. This enables the entire stranding and measuring frame VMG11 to be pivoted out of the unwind devices KO1 and KO2, which are arranged in alignment with one another.

The stranding direction in FIG. 19 is assumed to extend from right to left along the axis RA, that is to say conversely to that in FIG. 16.

Figure 20:
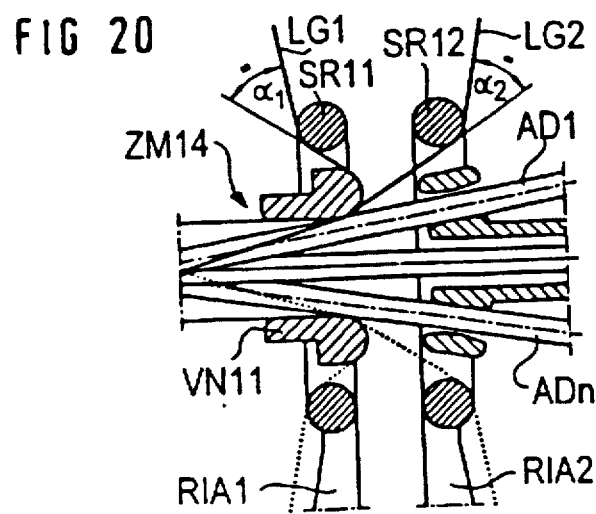

Provided in FIG. 20 is a stranding nipple VN11 which is held on a holding tube VH11 (cf. FIG. 19) and is firmly connected to the actual stranding frame. Into this stranding nipple VN11 there runs a number of wires AD1 to ADn, and these are bundled by the stranding nipple VN11. At the same time, the thread-like elements LG1 and LG2 serving as retaining spiral run in as elongated product and, in so doing, rest on the rings SR11 and SR12, respectively, serving as force sensors. These rings SR11 and SR12 are connected to the corresponding ring holders RIA1 and RIA2. As a consequence of the resilient properties of the leaf springs BF11 to BF22, an ability of the rings SR11 and SR12 to deflect is thus given and these rings are mobile in the substantially axial direction, to be specific as a function of the magnitude of the tensile force of the elongated product LG1 and LG2 serving as retaining spiral. The measured value detection and forwarding is carried out in a manner analogous to that described in FIG. 16, only the two measuring signals which are produced by the force sensors MR11 and MR12 are used separately for the control of the respective drives of the supply coils or cops, that is to say the measuring probe MR11 controls the cop drive of KO1 and the measuring sensor controls the cop drive of KO2. The angles $\alpha 1$ and $\alpha 2$, which are formed on the one hand by the run-in direction of the respective elongated product LG1 and LG2 and the tangents at the vertex of the bearing region or contact region on the respective rings SR11 and SR12, should expediently be selected to be approximately equally large, in order that the two force distributions (cf. FIG. 18) for the two measuring probes MR11 and MR12 are likewise approximately equally large and thus, in both cases, it is possible to achieve a regulation of the tensile stressing of the elongated product which is as uniform as possible and as similar as possible.

We claim:

1. In a winding device for winding at least one elongated element under a prescribed tensile stress onto an elongated cable with a longitudinal axis and is running along in an axial passage direction, said device having a supply coil for each elongated element to be drawn off therefrom, a measuring probe for measuring tensile stresses of the elongated element on a path from the supply coil to the cable product, the improvement comprising the measuring probe having an inner rim for jointly surrounding the cable product and the elongated element as both the cable product and elongated element pass therethrough, the measuring probe being designed so that the elongated element runs along the inner rim of the measuring probe in a circumferential direction and in doing so runs therearound the cable product and said winding device having an evaluation/control means for evaluating the tensile stresses of the elongated element being measured by the measuring probe and for controlling the winding of the elongated element so that the prescribed tensile stress for the elongated element is observed.

2. In a winding device according to claim 1, wherein the measuring probe is of essentially circularly cylindrical design.

3. In a winding device according to claim 1, wherein the measuring probe surrounds the cable product being processed essentially concentrically.

4. In a winding device according to claim 1, wherein the measuring probe is mounted so as to be displaceable along the axial passage direction of the cable product being processed.

5. In a winding device according to claim 1, wherein the measuring probe is designed as a non-resilient element.

6. In a winding device according to claim 1, wherein the measuring probe is held resiliently, viewed in the axial passage direction.

7. In a winding device according to claim 6, which includes means which effect a spring prestress being provided for the resilient mounting of the measuring probe.

8. In a winding device according to claim 1, wherein the measuring probe is mounted on at least one leaf spring.

9. In a winding device according to claim 8, wherein two leaf springs of identical type and identical length are provided for mounting the measuring probe.

10. In a winding device according to claim 1, wherein a cable core of electrical and/or optical transmission elements is used as the elongated cable product.

11. In a winding device according to claim 1, wherein threads, retaining spirals, or ribbons are used as the elongated element.

12. In a winding device according to claim 1, wherein the evaluation/control device is coupled back to a respective drive device and/or braking device for the supply coil and/or to an unwind device for setting the tensile stress of the elongated element.

13. In a winding device according to claim 1, which includes unwinding means for drawing off the elongated element from the supply coil.

14. In a winding device according to claim 1, wherein the device has a stranding nipple for stranding a plurality of stranding elements to form the cable product.

15. In a winding device according to claim 14, wherein the measuring probe, when viewed in the axial passage direction of the cable product being processed, is arranged immediately in front of the stranding nipple.

16. In a winding device according to claim 14, wherein the measuring probe is fitted on the outside on the outer circumference of the stranding nipple.

17. In a winding device according to claim 16, wherein the measuring probe surrounds the stranding nipple concentrically.

18. In a winding device according to claim 14, wherein the measuring probe is essentially formed by the stranding nipple.

19. In a winding device according to claim 14, wherein, viewed in the axial passage direction, the opening of the inner rim of the measuring probe is situated in front of an entry opening of the stranding nipple.

20. In a winding device according to claim 1, wherein the measuring probe has a ring shape for jointly surrounding the cable product and the elongated element.

21. In a winding device according to claim 20, wherein the probe is designed as a measuring ring.

22. In a winding device according to claim 21, wherein the measuring ring has an internal diameter which is selected to be equal to or larger than the internal diameter of the subsequent stranding nipple.

23. In a winding device according to claim 21, wherein an internal diameter of the measuring ring is selected to be between 1.5 and 5 times larger than the external diameter of the cable product.

24. In a winding device according to claim 21, wherein the measuring ring has an essentially circular form.

25. In a winding device according to claim 1, wherein the measuring probe is designed as a measuring tube.

26. In a winding device according to claim 1, wherein the measuring probe is arranged so as to be deflectable in the axial passage direction of the cable product.

27. In a winding device according to claim 1, wherein said measuring probe has at least one force sensor which converts the tensile force of the elongated element picked up by the measuring probe into measuring signals and feeds them to the evaluation/control means.

28. In a winding device according to claim 1, wherein the measuring probe is designed for measuring tensile stresses in the elongated element which are less than 100 cN.

29. In a winding device according to claim 1, wherein the measuring probe is a measuring ring mounted in a sleeve which is deflected as a whole in the axial passage direction.

30. In a winding device according to claim 1, wherein a measuring probe is provided for each elongated element.

31. A method for winding at least one elongated element under a prescribed tensile stress onto an elongated cable product, said method comprising the steps of providing a winding device for winding at least one elongated element onto the elongated cable product, said device including a supply coil for each elongated element, means for winding each element on the cable product, a measuring probe for measuring tensile stresses of the elongated element on a path from the supply coil to the cable product and evaluation/control means for receiving measuring signals for the tensile stresses of the elongated element from the measuring probe; drawing the cable product along an axial passage direction and passing the cable product through the measuring probe; guiding the elongated element to press through the measuring probe so that the elongated element is running along an inner rim of the measuring probe in a circumferential direction and is winding around the moving cable product with the elongated element and cable product being jointly surrounded by the inner rim, evaluating the measured tensile stress of the elongated element by the evaluation/control means and providing control signals for the winding of the elongated element, and controlling the winding of the elongated element by said control signals of the evaluation/control means so that the prescribed tensile stress for the elongated element is observed.

32. A method according to claim 31, which includes feeding the elongated cable product and the elongated element to a stranding nipple after passing through the measuring probe.

33. A method according to claim 31, wherein the changes in the tensile stress of the elongated element creates axial movement of the measuring probe, said method including determining the changes in the axial position of the measuring probe, and applying these changes to the evaluation/control means.

34. A method according to claim 31, which includes deflecting the elongated element from a first path from the supply coil with the measuring probe into a second direction.

35. A method according to claim 34, wherein the deflecting from the first path to the second direction is through an angle in a range of between 2° and 60°.

* * * * *